US011252488B2

(12) United States Patent
Kewitsch

(10) Patent No.: US 11,252,488 B2
(45) Date of Patent: Feb. 15, 2022

(54) INCREMENTALLY SCALABLE, TWO-TIER SYSTEM OF ROBOTIC, FIBER OPTIC INTERCONNECT UNITS ENABLING ANY-TO-ANY CONNECTIVITY

(71) Applicant: Telescent, Inc., Irvine, CA (US)

(72) Inventor: Anthony Stephen Kewitsch, Santa Monica, CA (US)

(73) Assignee: TELESCENT INC., Irvine, CA (US)

( * ) Notice: Subject to any disclaimer, the term of this patent is extended or adjusted under 35 U.S.C. 154(b) by 77 days.

(21) Appl. No.: 16/888,602

(22) Filed: May 29, 2020

(65) Prior Publication Data

US 2020/0359117 A1    Nov. 12, 2020

Related U.S. Application Data

(63) Continuation-in-part of application No. 16/543,233, filed on Aug. 16, 2019, which is a
(Continued)

(51) Int. Cl.
*G02B 6/36* (2006.01)
*H04Q 11/00* (2006.01)
(Continued)

(52) U.S. Cl.
CPC ......... *H04Q 11/0062* (2013.01); *H04B 10/25* (2013.01); *H04B 10/27* (2013.01);
(Continued)

(58) Field of Classification Search
CPC ........... H04Q 11/0062; H04Q 11/0005; H04Q 2011/0081; H04Q 2011/0058;
(Continued)

(56) References Cited

U.S. PATENT DOCUMENTS 6,243,510 B1    6/2001 Rauch
6,335,992 B1    1/2002 Bala et al.
(Continued)

FOREIGN PATENT DOCUMENTS

WO    2018071341        4/2018
WO    2021021280 A1     2/2021
(Continued)

OTHER PUBLICATIONS

USPTO, Non-final Office action for U.S. Appl. No. 16/378,266, filed Aug. 17, 2020. 13 pages.
(Continued)

*Primary Examiner* — Ellen E Kim
(74) *Attorney, Agent, or Firm* — Siritzky Law, PLLC

(57) ABSTRACT

Systems and methods to incrementally scale robotic software-defined cross-connects from 100 to more than 100,000 ports are disclosed. A system is comprised of individual cross-connect units that individually scale in increments of say, 96 interconnects in tier 1 to, for example, 1,008 interconnects total. A system comprised of multiple cross-connect units arranged and interconnected in a two-tier approach is disclosed, one which achieves fully non-blocking, any-to-any connectivity with the flexibility to grow incrementally. Methods to build out this system over time, in an incremental and non-service interrupting fashion, are described.

19 Claims, 51 Drawing Sheets

Related U.S. Application Data continuation-in-part of application No. 16/378,266, filed on Apr. 8, 2019, which is a continuation of application No. PCT/US2017/055789, filed on Oct. 9, 2017, said application No. 16/888,602 is a continuation-in-part of application No. 16/378,266, filed on Apr. 8, 2019.

(60) Provisional application No. 62/881,908, filed on Aug. 1, 2019.

(51) Int. Cl.
*H04B 10/27* (2013.01)
*H04B 10/25* (2013.01)

(52) U.S. Cl.
CPC ... *H04Q 11/0005* (2013.01); *H04Q 2011/009* (2013.01); *H04Q 2011/0058* (2013.01); *H04Q 2011/0081* (2013.01)

(58) Field of Classification Search
CPC ....... H04Q 2011/009; H04Q 2011/005; H04Q 2011/006; H04B 10/27; H04B 10/25
See application file for complete search history.

(56) References Cited

U.S. PATENT DOCUMENTS

| | | | |
|---|---|---|---|
| 6,973,251 B2 | 12/2005 | Morellec | |
| 7,289,197 B2 | 10/2007 | Kewitsch | |
| 7,315,681 B2 | 1/2008 | Kewitsch | |
| 7,460,753 B2 | 12/2008 | Kewitsch | |
| 7,665,901 B2 | 2/2010 | Kewitsch | |
| 7,747,124 B2 | 6/2010 | Xia | |
| 7,920,764 B2 | 4/2011 | Kewitsch | |
| 7,924,052 B1 | 4/2011 | Feng | |
| 8,068,715 B2 | 11/2011 | Kewitsch | |
| 8,150,227 B2 | 4/2012 | Kewitsch | |
| 8,175,425 B2 | 5/2012 | Chen | |
| 8,369,321 B2 | 2/2013 | Aybay | |
| 8,428,405 B2 | 4/2013 | Kewitsch | |
| 8,463,091 B2 | 6/2013 | Kewitsch | |
| 8,480,310 B2 | 7/2013 | Kewitsch | |
| 8,488,938 B2 | 7/2013 | Kewitsch et al. | |
| 8,554,033 B2 | 10/2013 | Kewitsch | |
| 8,805,155 B2 | 8/2014 | Kewitsch | |
| 9,052,465 B2 | 6/2015 | Kewitsch | |
| 9,052,490 B2 | 6/2015 | Kewitsch | |
| 9,110,249 B2 | 8/2015 | Kewitsch | |
| 9,188,748 B2 | 11/2015 | Kewitsch | |
| 9,225,666 B1 | 12/2015 | Aybay | |
| 9,411,108 B2 | 8/2016 | Kewitsch | |
| 9,703,060 B2 | 7/2017 | Kewitsch | |
| 10,042,122 B2 | 8/2018 | Kewitsch | |
| 10,345,526 B2 | 7/2019 | Kewitsch et al. | |
| 10,649,149 B2 | 5/2020 | Kewitsch | |
| 10,895,691 B2 | 1/2021 | Kewitsch | |
| 10,932,019 B1* | 2/2021 | Marti | H04J 14/0227 |
| 10,977,458 B2* | 4/2021 | Kewitsch | G02B 6/3895 |
| 2005/0031250 A1 | 2/2005 | Schroeder | |
| 2005/0275504 A1 | 12/2005 | Torza | |
| 2013/0077919 A1 | 3/2013 | Zong | |
| 2014/0115137 A1* | 4/2014 | Keisam | H04L 41/04 709/223 |
| 2014/0314099 A1* | 10/2014 | Dress | H04L 49/15 370/422 |
| 2015/0331199 A1 | 11/2015 | Kewitsch | |
| 2016/0202424 A1 | 7/2016 | Kewtisch | |
| 2017/0171111 A1* | 6/2017 | Khare | H04L 49/109 |
| 2017/0262567 A1* | 9/2017 | Vassiliev | H03K 19/17736 |
| 2019/0293875 A1 | 9/2019 | Kewitsch | |
| 2020/0003978 A1 | 1/2020 | Kewitsch | |
| 2020/0041725 A1 | 2/2020 | Kewitsch | |
| 2020/0358277 A1 | 11/2020 | Kewitsch | |
| 2020/0359117 A1 | 11/2020 | Kewitsch | |
| 2021/0072483 A1 | 3/2021 | Kewitsch et al. | |
| 2021/0101233 A1 | 4/2021 | Kewitsch | |
| 2021/0149468 A1* | 5/2021 | Walsh | H02J 1/10 |
| 2021/0232154 A1 | 7/2021 | Kewitsch | |
| 2021/0239910 A1 | 8/2021 | Kewitsch | |

FOREIGN PATENT DOCUMENTS

| | | |
|---|---|---|
| WO | 2021046227 A1 | 3/2021 |
| WO | 2021158492 A1 | 8/2021 |

OTHER PUBLICATIONS

WIPO, Written Opinion of the International Searching Authority from International Application No. PCT/US2017/055789, dated Feb. 5, 2018. (11 pages).

WIPO, International Search Report from International Application No. PCT/US2017/055789, dated Feb. 5, 2018. (4 pages).

WIPO, International Preliminary Report on Patentability for International Application No. PCT/US2017/055789, dated May 7, 2019. (1 page).

USPTO, Non-final Office action for U.S. Appl. No. 16/543,233, filed Jul. 9, 2020. 9 pages.

USPTO, Final Office action for U.S. Appl. No. 16/543,233, filed Feb. 4, 2021. 11 pages.

USPTO, Final Office action for U.S. Appl. No. 16/378,266, filed Feb. 12, 2021. 14 pages.

* cited by examiner

48 MANAGED INTERCONNECTS

DUPLEX ANY TO ANY

- BASE NTM WITH NO FIBER MODULES IS 48 DUPLEX INTERCONNECTS

|  | NTM RACKS | NTM MODULES | TRUNKS (DUPLEX) |
|---|---|---|---|
| TOTAL | 1 | 1 | 0 |

DUPLEX ANY TO ANY

528 MANAGED INTERCONNECTS

| NTM RACKS | NTM MODULES | TRUNKS (DUPLEX) |
|---|---|---|
| 1 | 6 | 0 |
| TOTAL | | |

• ADD 5 FIBER MODULES IN FIELD

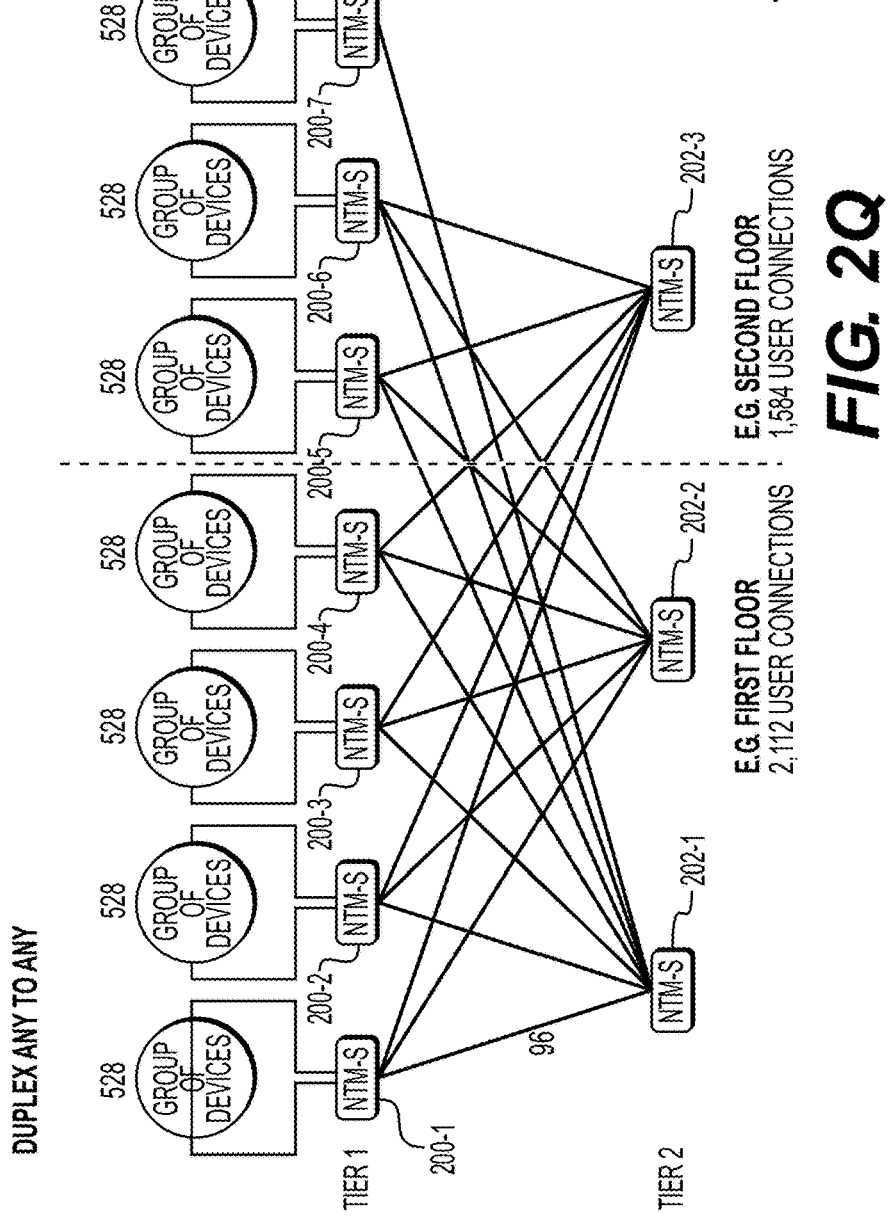

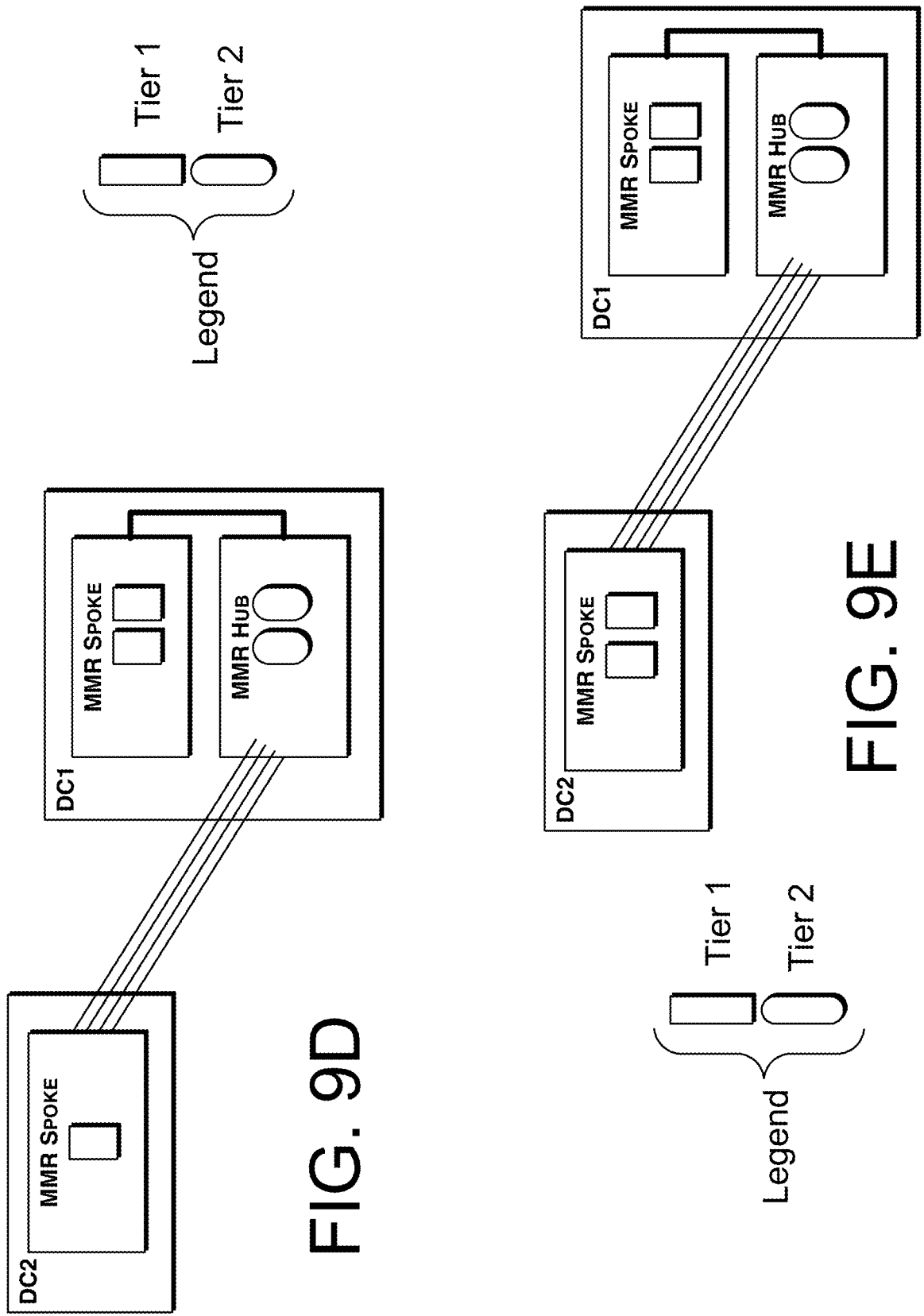

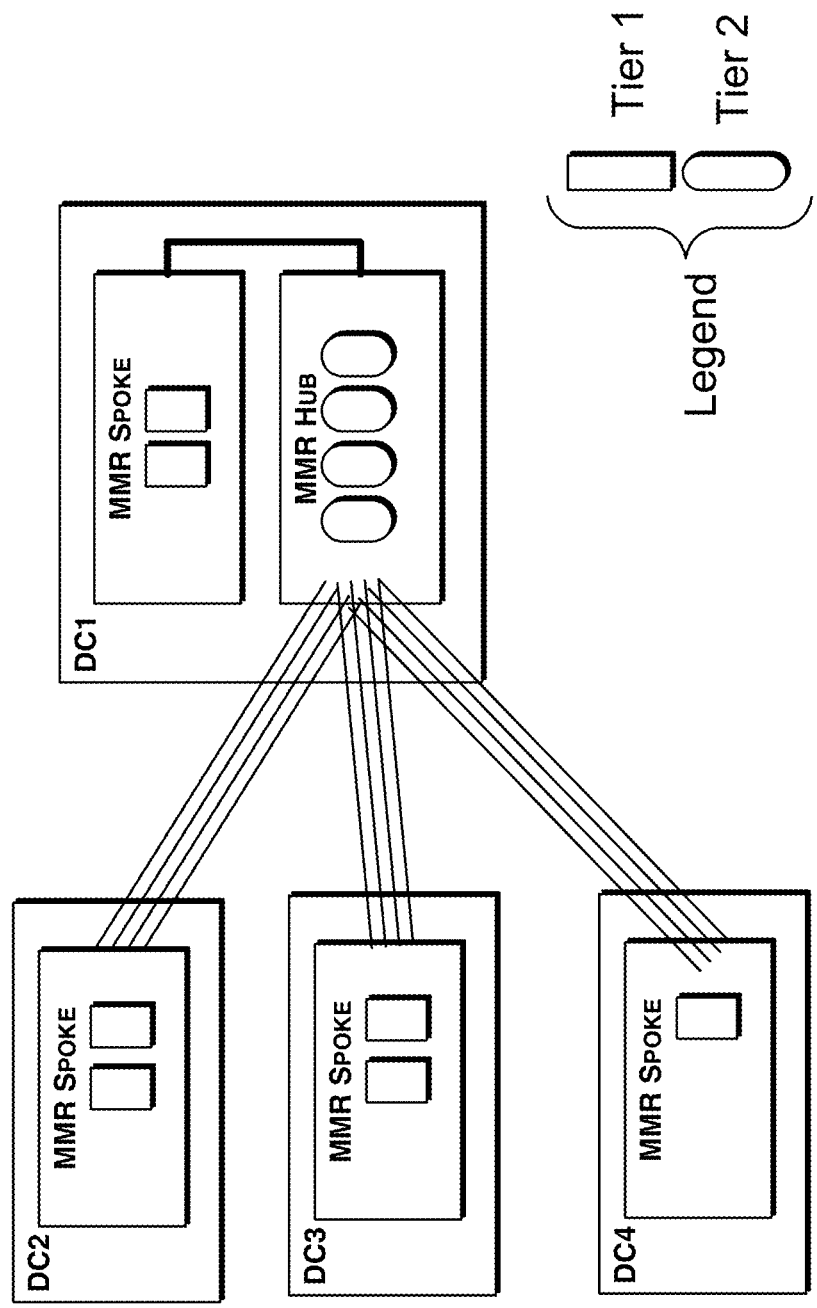

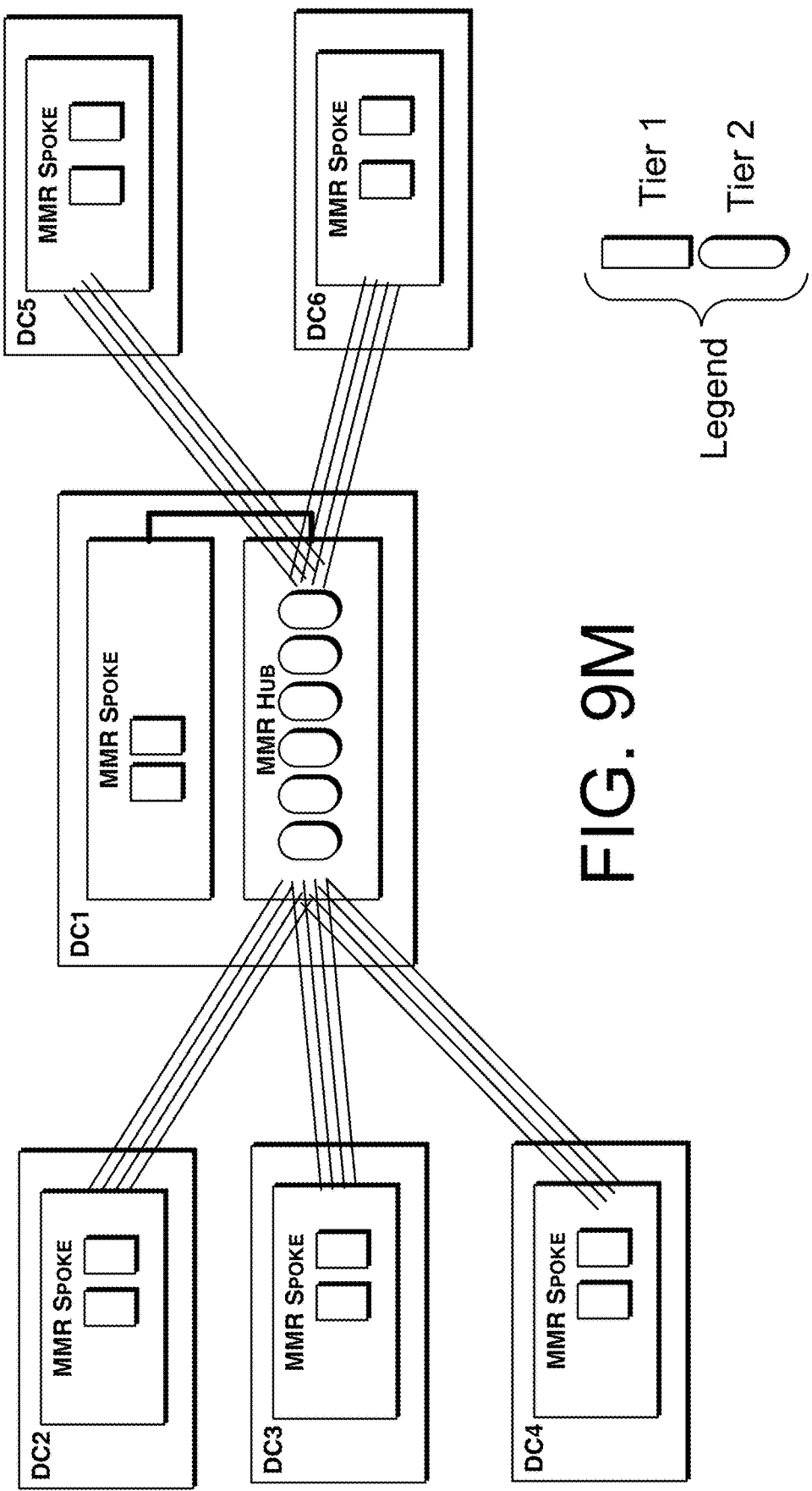

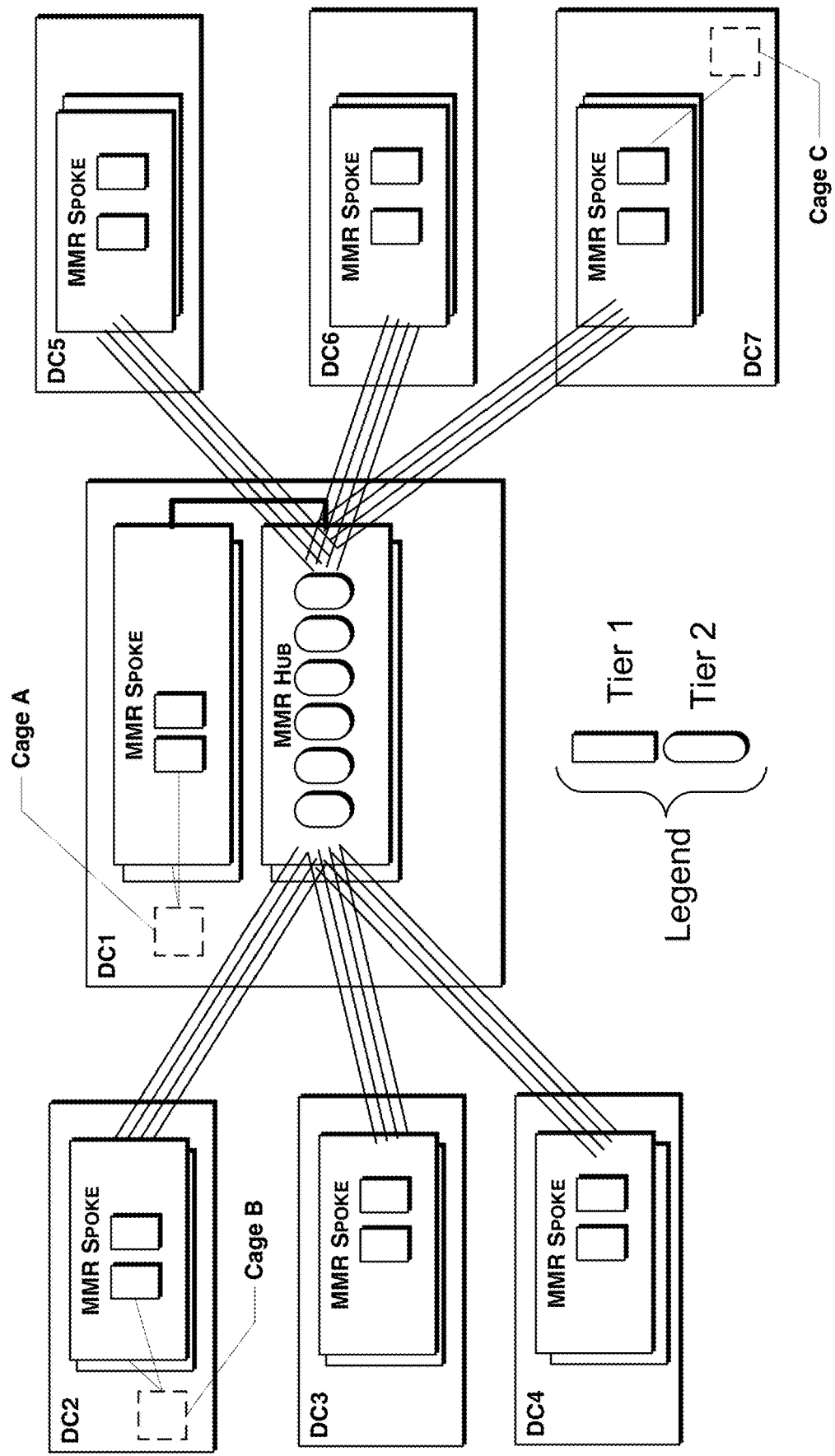

INCREMENTALLY SCALABLE, TWO-TIER SYSTEM OF ROBOTIC, FIBER OPTIC INTERCONNECT UNITS ENABLING ANY-TO-ANY CONNECTIVITY

RELATED APPLICATIONS

This application claims the benefit of U.S. Provisional Patent Application No. 62/881,908 filed Aug. 1, 2019, the entire contents of which are hereby fully incorporated herein by reference for all purposes. This application is a Continuation-in-Part (CIP) of U.S. patent application Ser. No. 16/543,233, filed Aug. 16, 2019, published as US 20200041725 on Feb. 6, 2020, and Ser. No. 16/378,266, filed Apr. 8, 2019, published as US 20190293875 on Sep. 26, 2019, the entire contents of each of which are hereby fully incorporated herein by reference for all purposes.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to distributed, large scale communication systems comprised of fiber optic cables to transmit illumination and/or signals. More particularly, this invention relates to a multi-tiered robotically reconfigurable interconnection system comprised of large numbers of fiber optic cables aggregated into trunk lines connecting the multi-tiers and under software control.

BACKGROUND

Large scale automated fiber optic cross-connect switches and software-defined patch-panels enable data centers and data networks to be fully automated, wherein the physical network topologies are software-defined or programmable, for improved efficiencies and cost savings. Current fiber optic switch technologies such as cross-bar switches scale as $N^2$ (where N is the number of ports) making them ill-suited for large scale production networks. Prior art disclosures of cross-bar switches include U.S. Pat. No. 4,955,686 to Buhrer et al., U.S. Pat. No. 5,050,955 to Sjolinder, U.S. Pat. No. 6,859,575 to Arol et al., and U.S. Pat. No. 2011/0116739A1 to Safrani et al.

More recent automated patch-panel approaches that scale as linearly with the number of ports utilize braided fiber optic strands. Advances in the mathematics of topology and Knot and Braid Theory (U.S. Pat. Nos. 8,068,715, 8,463,091, 8,488,938 and 8,805,155 to Kewitsch) have solved the fiber entanglement challenge for dense collections of interconnect strands undergoing arbitrary and unlimited reconfigurations. Since this Knots, Braids and Strands (KBS) technology scales linearly in the number of interconnect strands, significant benefits over cross-bar switches such as density and hardware simplicity are realized. Existing systems featuring autonomous patch panel systems and implementing KBS algorithms in accordance with the Kewitsch patents referenced above typically utilize a pick and place robotic actuation system with a gripper at the end of the robotic arm to grab and transport a fiber optic connector and the fiber optic strand extending therefrom to a central backbone in the system.

There is a need to scale to larger systems by utilizing multiple, separate cross-connect racks. The Clos three-tier cross-bar or matrix switch approach to scale beyond a single matrix switch unit with a given number of ports is well known in the prior art [Charles Clos, "A Study of Non-blocking Switching Networks," Bell System Technical Journal, Volume 32, pp. 406-424, March 1953]; however, it requires the initial deployment of a large number of cross-bar or matrix switch units, requires three times the number of ports and is not practically scalable in an incremental fashion over time. The development of a cross-connect system design and process to enable incremental scalability for a system of cross-connects, beyond that of an individual cross-connect unit, and potentially with less than three times the number of ports, is the topic of this invention.

SUMMARY

The present invention is specified in the claims as well as in the below description.

These features along with additional details of the invention are described further in the examples herein, which are intended further to illustrate the invention but are not intended to limit its scope in any way.

According to aspects of this invention, an incrementally scalable automated cross-connect system comprised of multiple modular, robotic interconnect units in a multi-tier system is disclosed. In a particular example, we disclose a two-tier design in which a first tier of robotic interconnect units has user ports and trunk ports in a predetermined ratio, a second tier of robotic interconnect units has trunk ports only, and trunk lines connecting the trunk ports of the first and second tiers of robotic interconnect units. The robotic interconnect units may individually consist of multi-interconnect modules enabling the number of interconnects in each unit to be increased, and the system enables the number of units within the system to be increased. An exemplary method of adding interconnections to an existing system of units in a non-service interrupting process is also disclosed.

One general aspect includes a method of incrementally scaling a system of cross-connect units in a multi-tier arrangement to provide a given number of user interconnections. The method also includes (a) for each particular network topology manager (NTM) of a plurality of NTMs in a first tier of said multi-tier arrangement: (a) connecting up to a particular set of k devices on said particular NTM in said first tier such that any device in said particular set can interconnect directly with any other device connected to said particular NTM, said particular NTM may include a plurality of interconnect modules, each module having a substantially identical number of interconnects. The method also includes (b) installing truck line interconnections between said plurality of NTMs in said first tier to a number of NTMs in a second tier of said multi-tier arrangement. The method also includes where sufficient trunk line interconnections are installed to create inter-NTM interconnections required to support the given number of user interconnections and to enable any first user interconnection to connect to any second user interconnection.

Other embodiments of this aspect include corresponding computer systems, apparatus, and computer programs recorded on one or more computer storage devices, each configured to perform some or all of the actions of the methods.

Implementations may include one or more of the following features, alone or in various combination(s):
The method where each NTM in the second tier supports about 100 inter-NTM interconnections.
The method where the maximum capacity of user interconnections is equal to 2,500.
The method where each NTM in the second tier supports about 50 inter-NTM interconnections.
The method where the maximum capacity of user interconnections is equal to 5,000.
The method where K is about 500.
The method where at least some NTMs in the first tier are co-located.
The method where at least some NTMs in the first tier are co-located with at least some NTMs in the second tier.
The method where at least some NTMs in the first tier are located at distinct locations.
The method where at least some NTMs in second first tier are located at distinct locations.

Another general aspect includes a method of incrementally scaling a system of cross-connect units in a two-tier system of network topology managers (NTMs). The method also includes (a) connecting up to N/2 user ports to N/2 devices on a first tier, said first NTM having N user ports. The method also includes (b) adding an additional NTM to said first tier. The method also includes (c) installing additional fiber modules and/or an NTM in said second tier to support connections between NTM pairs in said first tier.

Implementations may include one or more of the following features, alone or in various combination(s):
The method where said additional NTM is added to said first tier in (b) when interconnections on the NTM in the first tier are fully exhausted at N/2 devices.
The method where Fiber modules and first tier to second tier fixed trunk line cables are installed in numbers to support x % of local user connections and (100-x) % in express connections to another NTM in said first tier.
The method where at least two of the NTMs have different port counts.
The method where x % of local user connections may be different for each NTM in said first tier.
The method where P is an integer multiple of 12.
The method where, in (c), there are up to P fiber connectors between any pair of NTMs in said first tier and said second tier,
where $P=N^2/2M$, rounded up to the nearest integer.
The method where N is about 1,000 to 2,000.
The method where N is 960 to 2,000, and M is 4,800 to 160,000.

Another general aspect includes a method of scaling a robotically reconfigurable passive fiber interconnect fabric in a leaf and spine configuration to support connectivity requirements as data center interconnect fabric grows and as new data centers are added. The method also includes installing a first leaf NTM in first data center. The method also includes adding a second leaf NTM once x % of ports of first leaf NTM are connected to users in first data center, for some number x. The method also includes installing a spine NTM to connect (100-x) % of ports between first and second leaf NTMs in first data center and connecting spine NTM to leaf NTMs through trunk lines. The method also includes installing additional leaf NTMs in second data center and connecting this leaf NTM to the one or more spine NTMs in first data center. The method also includes repeating this process of adding leaf and spine NTMs and trunk lines therebetween as data centers are added.

Implementations may include the method where x is 25 to 75.

Another general aspect includes a method of incrementally deploying a fabric of passive interconnections. The method also includes deploying an interconnect fabric within a single rack and at least 100 user ports, where the capacity to increase the number of user ports is maintained by configuring no more than half the ports of each of said one or more first tier NTMs as user ports, and reserving the remaining ports of each of said one or more first tier NTMs as trunk ports.

Implementations may include deploying (i) at least one additional NTM in said first tier and/or (ii) at least one additional NTM in a second tier.

Another general aspect includes an incrementally scalable multi-tier NTM interconnect system. The incrementally scalable multi-tier NTM interconnect system also includes one or more tier 1 NTMs. The system also includes one or more tier 2 NTMs. The system also includes element managers for said NTMs to perform KBS routing of fiber. The system also includes trunk lines connecting tier 1 NTMs and tier 2 NTMs. The system also includes user interconnects connected to a portion of tier 1 NTM ports. The system also includes an NTM system controller accepting commands create an interconnection between a first user port and a second user port where said first user port and said second user port are on the one or more tier 1 NTMs, the controller in communication with all NTMs and sending reconfiguration instructions to all NTMs necessary to create an interconnection between said first user port and said second user port.

Implementations may include one or more of the following features, alone or in various combination(s):
The system where an NTM trunk line routing mechanism determines an optimal set of NTMs based on a cost function to create an optimal fiber interconnection between said first user port and said second user port and passing through multiple NTMs and fiber trunk lines.
The system where the cost function is designated to minimize one or more of: (i) insertion loss, and/or (ii) a number of hops through NTMs.
The system where the maximum number of user interconnects is equal to half of a total number of user ports in said one or more tier 1 NTMs.
The system where at least some of said one or more tier 1 NTMs are co-located with at least some of said one or more tier 2 NTMs.
The system where at least some of said tier 1 NTMs are located at distinct locations.
The system where at least some of said one or more tier 2 NTMs are located at distinct locations.
The system where at least some of said one or more tier 1 NTMs are co-located.

Another aspect includes an NTM device in which a robot reconfigures an interconnect comprised of two optical fibers, each with a core and cladding, coextensive within a single element, to increase a number of user ports supported by a single tier 1 NTM device by a factor of two.

Implementations may include one or more of the following features, alone or in various combination(s):
The device where the single element has an outer diameter of about 0.4 to 0.5 mm.
The device where the single element is terminated in a single connector with two adjacent cores.
The device where the two optical fibers have cladding outer diameters of 50 to 80 microns.

Below is a list of method or process aspects. Those will be indicated with a letter "P". Whenever such aspects are referred to, this will be done by referring to "P" aspects.

P1. A method of incrementally scaling a system of cross-connect units in a multi-tier arrangement to provide a given number of user interconnections, the method comprising:
  (A) for each particular network topology manager (NTM) of a plurality of NTMs in a first tier of said multi-tier arrangement:
    (A)(1) connecting up to a particular set of K devices on said particular NTM in said first tier such that any device in said particular set can interconnect directly with any other device connected to said particular NTM, said particular NTM comprising a plurality of interconnect modules, each module having a substantially identical number of interconnects; and
  (B) installing truck line interconnections between said plurality of NTMs in said first tier to a number of NTMs in a second tier of said multi-tier arrangement,
  wherein sufficient trunk line interconnections are installed to create inter-NTM interconnections required to support the given number of user interconnections and to enable any first user interconnection to connect to any second user interconnection.

P2. The method of embodiment(s) P1, wherein each NTM in the second tier supports about 100 inter-NTM interconnections.

P3. The method of any of embodiment(s) P1-P2, wherein the maximum capacity of user interconnections is equal to 2,500.

P4. The method of any of embodiment(s) P1-P3, wherein each NTM in the second tier supports about 50 inter-NTM interconnections.

P5. The method of any of embodiment(s) P1-P4, wherein the maximum capacity of user interconnections is equal to 5,000.

P6. The method of any of embodiment(s) P1-P5, wherein K is about 500.

P7. The method of any of embodiment(s) P1-P6 wherein at least some NTMs in the first tier are co-located.

P8. The method of any of embodiment(s) P1-P7, wherein at least some NTMs in the first tier are co-located with at least some NTMs in the second tier.

P9. The method of any of embodiment(s) P1-P8, wherein at least some NTMs in the first tier are located at distinct locations.

P10. The method of any of embodiment(s) P1-P9, wherein at least some NTMs in second first tier are located at distinct locations.

P11. A method of incrementally scaling a system of cross-connect units in a two-tier system of network topology managers (NTMs), wherein first and second tiers of NTMs are connected with fixed trunk lines containing multiple fiber interconnections, to up to a maximum of M user ports, the method comprising:
  (A) connecting up to N/2 user ports to N/2 devices on a first NTM in said first tier, said first NTM having N user ports;
  (B) adding an additional NTM to said first tier; and
  (C) installing additional fiber modules and/or an NTM in said second tier to support connections between NTM pairs in said first tier.

P12. The method of embodiment(s) P11, wherein said additional NTM is added to said first tier in (B) when interconnections on the NTM in the first tier are fully exhausted at N/2 devices.

P13. The method of any of embodiment(s) P11-P12, wherein fiber modules and first tier to second tier fixed trunk line cables are installed in numbers to support x % of local user connections and (100-x) % in express connections to another NTM in said first tier.

P14. The method of any of embodiment(s) P11-P13, wherein at least two of the NTMs have different port counts.

P15. The method of any of embodiment(s) P11-P14, wherein x % of local user connections may be different for each NTM in said first tier.

P16. The method of any of embodiment(s) P11-P15, wherein P is an integer multiple of P12.

P17. The method of any of embodiment(s) P11-P16, wherein, in (C), there are up to P fiber connectors between any pair of NTMs in said first tier and said second tier, where $P=N^2/2M$, rounded up to the nearest integer.

P18. The method of any of embodiment(s) P11-P17, wherein N is about 1,000 to 2,000.

P19. The method of any of embodiment(s) P11-P19, wherein N is 960 to 2,000, and M is 4,800 to 160,000.

P20. A method of scaling a robotically reconfigurable passive fiber interconnect fabric in a leaf and spine configuration to support connectivity requirements as data center interconnect fabric grows and as new data centers are added, the method comprising:
  installing a first leaf NTM in first data center;
  adding a second leaf NTM once x % of ports of first leaf NTM are connected to users in first data center, for some number x;
  installing a spine NTM to connect (100-x) % of ports between first and second leaf NTMs in first data center and connecting spine NTM to leaf NTMs through trunk lines;
  installing additional leaf NTMs in second data center and connecting this leaf NTM to the one or more spine NTMs in first data center; and
  repeating this process of adding leaf and spine NTMs and trunk lines therebetween as data centers are added.

P21. The method of embodiment(s) P20 wherein x is 25 to 75.

P22. A method of incrementally deploying a fabric of passive, non-blocking fiber optic interconnects reconfigurable by one or more robots that provide an increasing number of user ports based on user capacity requirements using a multi-tiered system of NTMs, said system comprising one or more first tier NTMs, each first tier NTM having user ports and trunk ports, the method comprising:
deploying an interconnect fabric within a single rack and at least 100 user ports, wherein the capacity to increase the number of user ports is maintained by configuring no more than half the ports of each of said one or more first tier NTMs as user ports, and reserving the remaining ports of each of said one or more first tier NTMs as trunk ports.

P23. The method of embodiment(s) P22, further comprising: deploying (i) at least one additional NTM in said first tier and/or (ii) at least one additional NTM in a second tier.

Below is a list of system aspects. Those will be indicated with a letter "S". Whenever such aspects are referred to, this will be done by referring to "S" aspects.

S24. An incrementally scalable multi-tier NTM interconnect system, the system comprising:
  one or more tier 1 NTMs;
  one or more tier 2 NTMs;
  element managers for said NTMs to perform KBS routing of fiber;
  trunk lines connecting tier 1 NTMs and tier 2 NTMs;
  user interconnects connected to a portion of tier 1 NTM ports; and
  an NTM system controller accepting commands create an interconnection between a first user port and a second user port, wherein said first user port and said second user port are on the one or more tier 1 NTMs, the controller in communication with at least some NTMs and sending reconfiguration instructions to at least some NTMs necessary to create an interconnection between said first user port and said second user port.

S25. The system of embodiment(s) S24, wherein an NTM trunk line routing mechanism determines an optimal set of NTMs based on a cost function to create an optimal fiber interconnection between said first user port and said second user port and passing through multiple NTMs and fiber trunk lines.

S26. The system of embodiment(s) S25, wherein the cost function is designated to minimize one or more of: (i) insertion loss, and/or (ii) a number of hops through NTMs.

S27. The system of any of embodiment(s) S24-S26, wherein the maximum number of user interconnects is equal to half of a total number of user ports in said one or more tier 1 NTMs.

S28. The system of any of embodiment(s) S24-S27, wherein at least some of said one or more tier 1 NTMs are co-located.

S29. The system of any of embodiment(s) S24-S28, wherein at least some of said one or more tier 1 NTMs are co-located with at least some of said one or more tier 2 NTMs.

S30. The system of any of embodiment(s) S24-S29, wherein at least some of said tier 1 NTMs are located at distinct locations.

S31. The system of any of embodiment(s) S24-S30, wherein at least some of said one or more tier 2 NTMs are located at distinct locations.

Below is a list of device aspects. Those will be indicated with a letter "D". Whenever such aspects are referred to, this will be done by referring to "D" aspects.

D32. An NTM device in which a robot reconfigures an interconnect comprised of two optical fibers, each with a core and cladding, coextensive within a single element, to increase a number of user ports supported by a single tier 1 NTM device by a factor of two.

D33. The device of embodiment(s) D32, wherein the single element has an outer diameter of about 0.4 to 0.5 mm.

D34. The device of any of embodiment(s) D32-D33, wherein the single element is terminated in a single connector with two adjacent cores.

D35. The device of any of embodiment(s) D32-D34, wherein the two optical fibers have cladding outer diameters of 50 to 80 microns.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 10 is an example of aspects of a 1+1 redundant, two-tier NTM architecture according to exemplary embodiments hereof in a data center campus for high reliability.

DETAILED DESCRIPTION OF THE PRESENTLY PREFERRED EXEMPLARY EMBODIMENTS

Glossary and Abbreviations

Figure 1A:
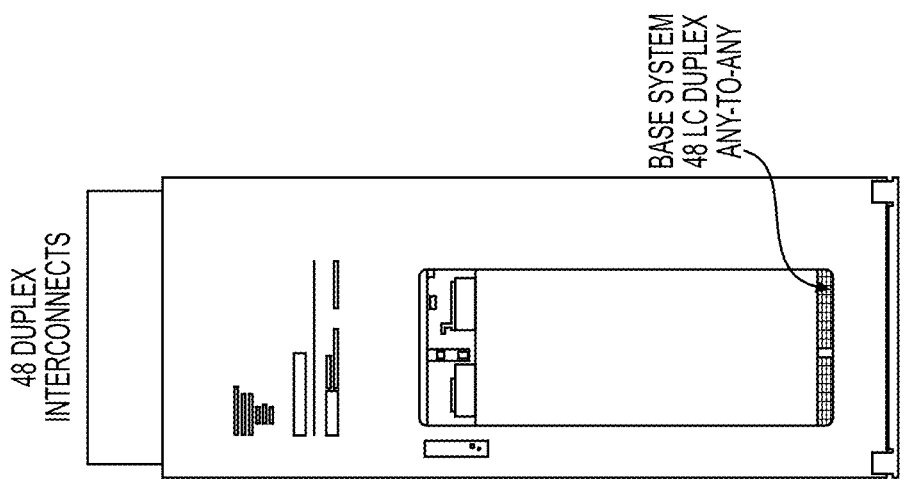
FIGS. 1A-1K show aspects of exemplary scaling of Network Topology Managers (NTMs) according to exemplary embodiments hereof.

As used herein, unless used or described otherwise, the following terms or abbreviations have the following meanings:

"KBS" means Knots, Braids and Strands;
"NTM" means Network Topology Manager;

As used herein, the term "mechanism" refers to any device(s), process(es), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

Description

Aspects hereof disclose incrementally scalable systems of robotic cross-connect units, referred to individually as a Network Topology Manager (NTM) providing low loss, software-defined fiber optic connections between a large number of pairs of ports.

NTM ports are classified herein as user ports (connected to external network devices) and trunk ports (connected to other NTMs to link NTMs from one tier to another, e.g., to link tier 1 and tier 2 NTMs). In a particular example, each NTM consists of multiple (e.g. 10) passive interconnect modules, each module substantially identical and containing a multiplicity (e.g. 48, 50, 96, 100, 120, or 192) of passive fiber interconnections. Note that fiber optic interconnect devices are typically configured in multiples of 12 ports based on current industry standards; however, in some examples which follow, system examples in multiples of 10 ports will also be described for illustrative purposes. Those of skill in the art will understand, upon reading this description, that different multiples of ports may be used and are contemplated herein. Passive fiber interconnect modules may be added to the NTM to create a larger non-blocking switch fabric, wherein an internal robot can move interconnections of one module to any other port within the same or any other module, without restriction, limitation, or entanglement.

In a further example, the number of ports may be increased from, for example, 48 interconnects to 5,280 interconnects and beyond by connecting multiple NTMs in a two-tier arrangement, wherein each NTM has a number of fiber interconnect modules necessary to support the required number of user ports and trunk ports. For example, 10 NTMs each with about 1,008 interconnects in tier 1 may be joined into a fully non-blocking switch fabric through an additional 5 NTMs, each with about 960 trunk ports in tier 2. Tier 1 and Tier 2 NTMs may be connected with up to about 4,800 trunk line fibers. Each base NTM may include 48×48 interconnects, and up to ten 96×96 interconnect expansion modules may be added to the same unit.

EXAMPLE 1

Vertical Scalability from 48 to 1,008 Duplex Interconnects

The NTM enables graceful scaling from 48 to 1,008 duplex fully non-blocking, any-to-any interconnections in a single rack. Fiber modules may be added one on top of another within a common rack, and this is referred to here, for the purposes of description, as vertical scaling. Each fiber module has, for example, 96 interconnects (or alternatively, 48 or 192 interconnects). The NTM's modular design with capacity for 1 to 10 fiber modules enables graceful scaling.

FIGS. 1A-1K show aspects of scaling by stacking fiber modules vertically, one at a time, within a single mainframe, according to exemplary embodiments hereof.

Figure 1B:
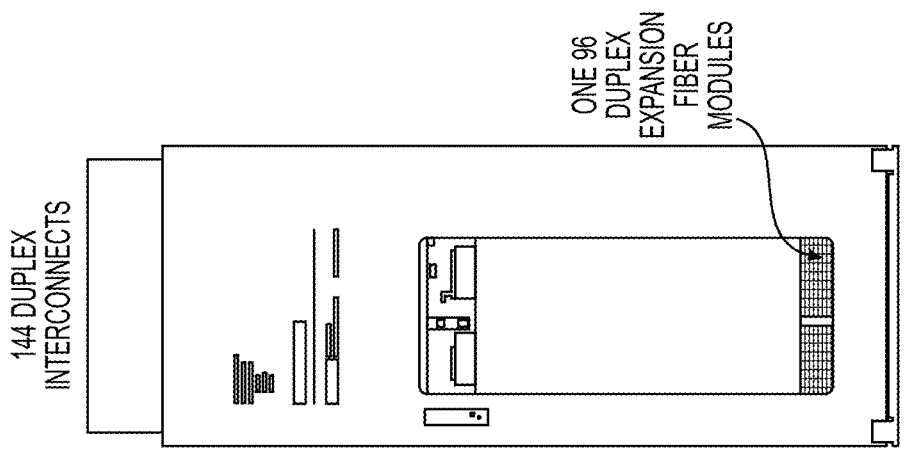
Figure 1C:
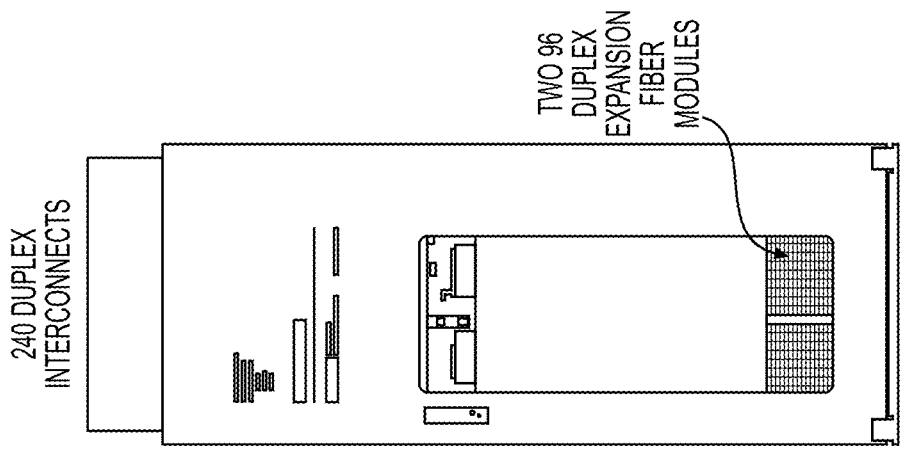
Figure 1F:
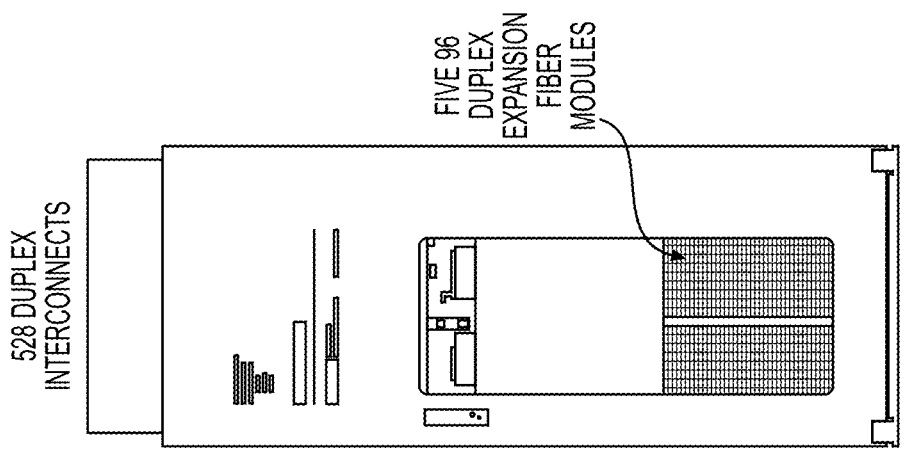
Figure 1E:
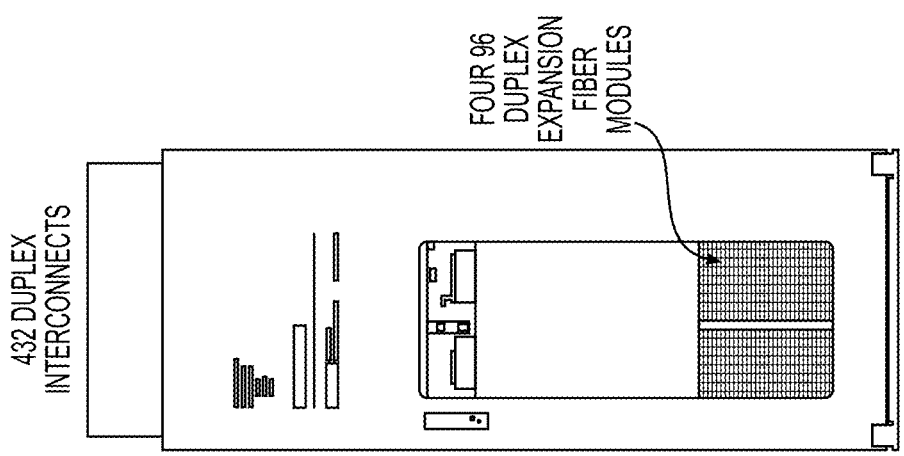
Figure 1D:
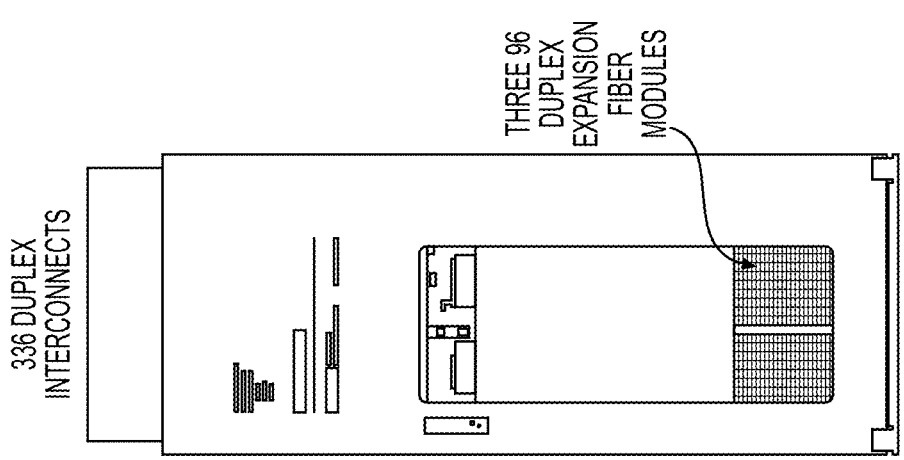
Figure 1I:
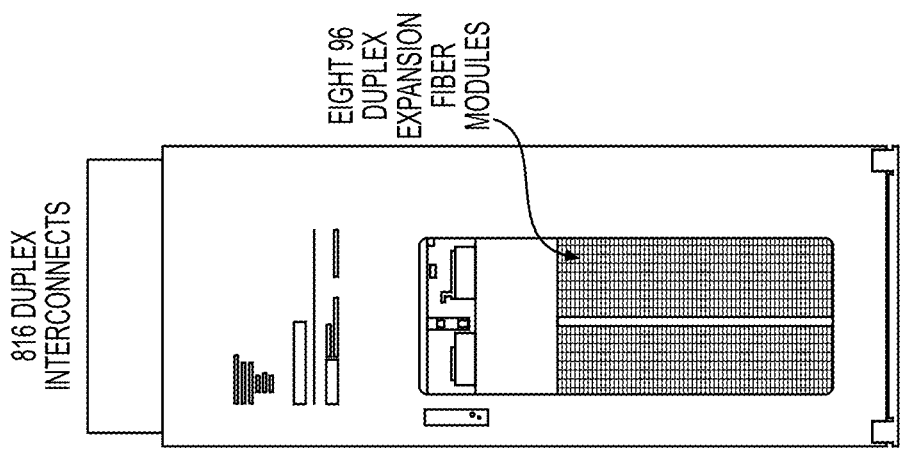
Figure 1H:
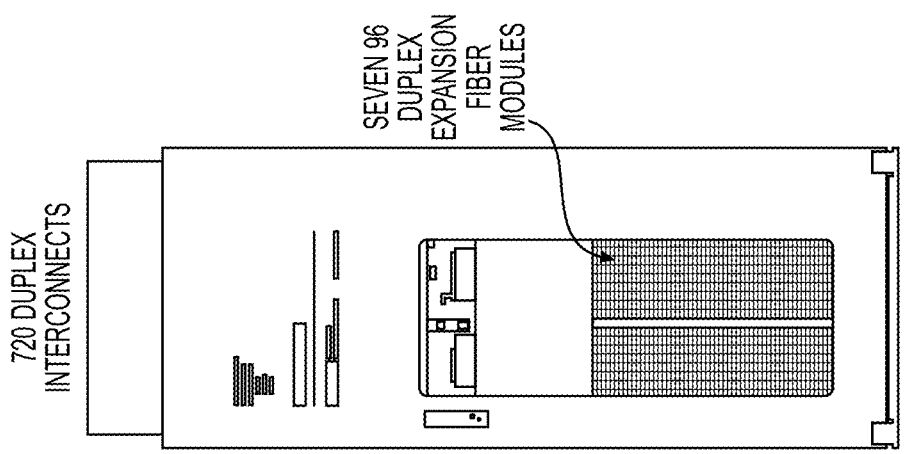
Figure 1G:
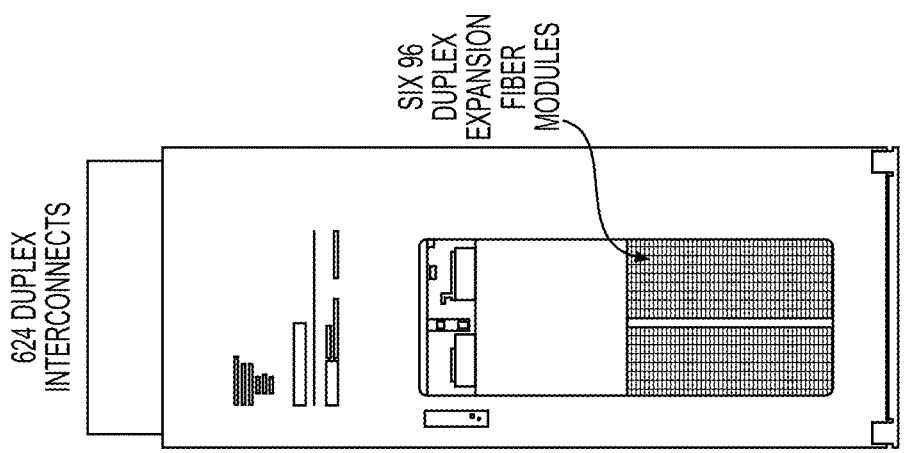
Figure 1K:
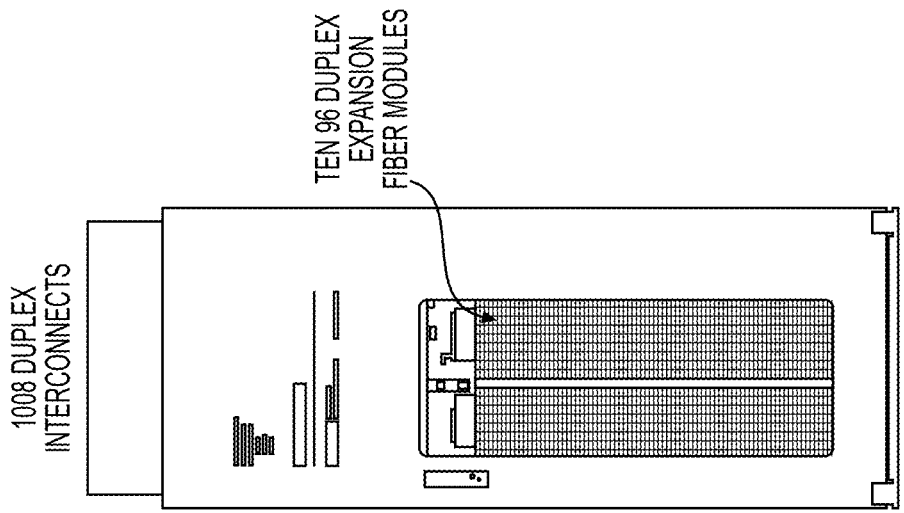
Figure 1J:
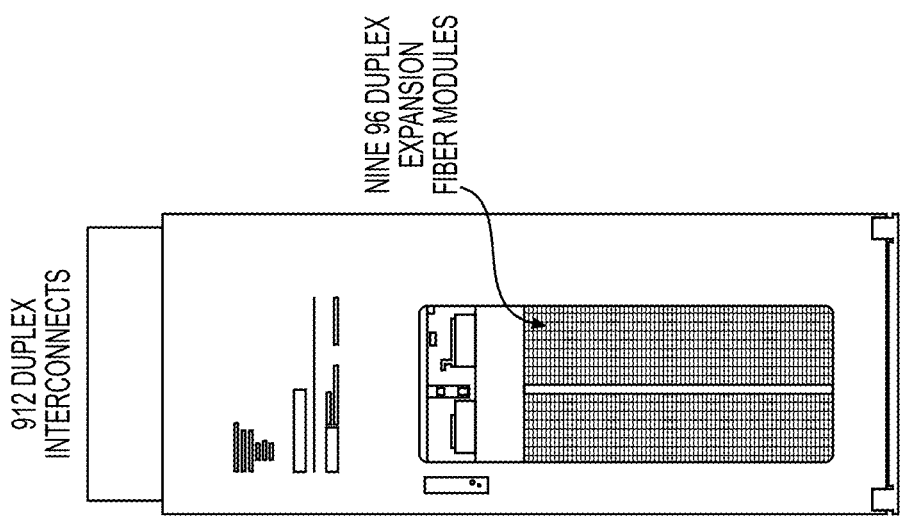

FIG. 1A depicts a base Network Topology Manager (NTM) system 100 with 48 LC duplex any-to-any interconnections 102. FIG. 1B depicts the NTM system 100 with one 96×96 fiber module 104 installed, to increase to 144 LC duplex any-to-any interconnections. FIG. 1C depicts the NTM system 100 with two 96×96 fiber modules 104, 106 installed, to increase to 240 LC duplex any-to-any interconnections. FIG. 1D depicts the NTM system 100 with three 96×96 fiber modules 104, 106, 108 installed, to increase to 336 LC duplex any-to-any interconnections. FIG. 1E depicts the NTM system 100 with four 96×96 fiber modules 104, 106, 108, 110 installed, to increase to 432 LC duplex any-to-any interconnections. FIG. 1F depicts the NTM system 100 with five 96×96 fiber modules 112 installed, to increase to 528 LC duplex any-to-any interconnections. FIG. 1G depicts the NTM system 100 with six 96×96 fiber modules 114 installed, to increase to 624 LC duplex any-to-any interconnections. FIG. 1H depicts the NTM system 100 with seven 96×96 fiber modules 116 installed, to increase to 720 LC duplex any-to-any interconnections. FIG. 1I depicts the NTM system 100 with eight 96×96 fiber modules 118 installed, to increase to 816 LC duplex any-to-any interconnections. FIG. 1J depicts the NTM system 100 with nine 96×96 fiber modules 120 installed, to increase to 912 LC duplex any-to-any interconnections. FIG. 1K depicts the NTM system 100 with ten 96×96 fiber modules 122 installed, to increase to 1,008 LC duplex any-to-any interconnections.

Note that modules installed at a later time maintain full connectivity to any and all other modules within the mainframe. That is, there are no physical partitions limiting the ability to achieve any-to-any non-blocking connectivity. Any-to-any duplex cable (Tx, Rx fiber pair) connectivity may be achieved by connecting transmit lines to back (front) and receive lines to front (back), or vice versa. The transmit line of any user device may then be connected to the receive line of any other use device, or to the same user device in the case of a loopback. A single shared robot is able to reconfigure all connections within all modules of the NTM. An advantage of this vertical scaling design and process is that any interconnection may be established while consuming only two ports. Insertion loss is also minimized because any interconnection only passes through one pair of fiber optic connectors, the primary source of insertion loss in an NTM.

An exemplary NTM is described in U.S. Pat. No. 10,649,149, the entire contents of which are hereby fully incorporated herein by reference for all purposes.

EXAMPLE 2

Horizontal Scalability from 528 to 5,280 Duplex Interconnects

In accordance with exemplary aspects hereof, for applications requiring more user ports/interconnects than that achievable by vertical scaling (e.g. beyond 1,008) within a single unit, multiple NTMs may be deployed in a multi-tier interconnect architecture. In the examples which follow, two-tier designs are described, however, those of skill in the art will realize and understand, upon reading this description, that these concepts hold for three tiers, four tiers, etc. as well. In general, the concepts described herein are applicable to N-tier interconnect architectures, for N≥2.

Figure 2A:
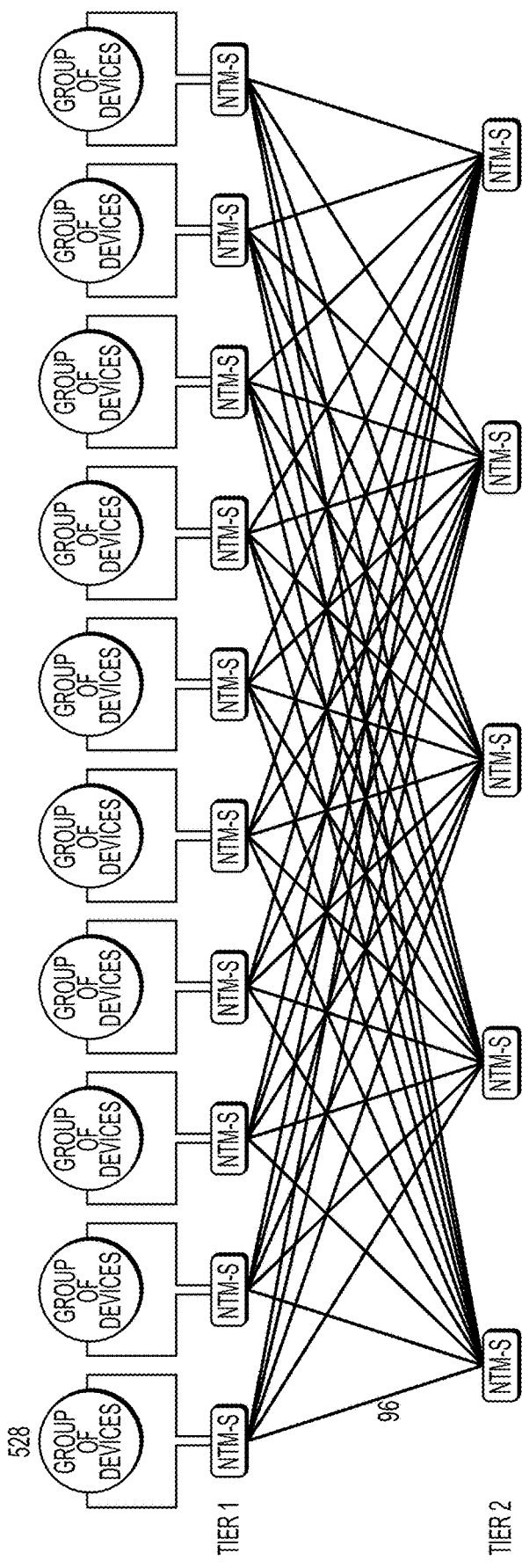
FIGS. 2A-2W illustrate aspects of an exemplary process to vertically scale interconnects within a single NTM, and subsequently to scale horizontally interconnects across multiple NTMs.
Figure 2B:
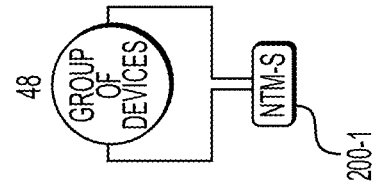
Figure 2C:
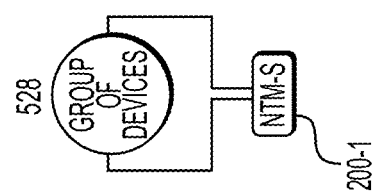
Figure 2D:
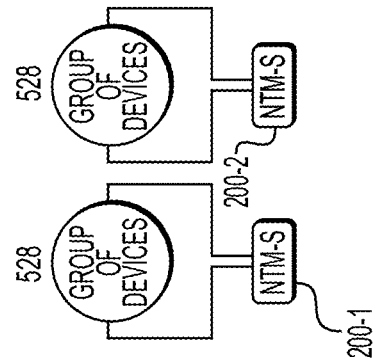
Figure 2E:
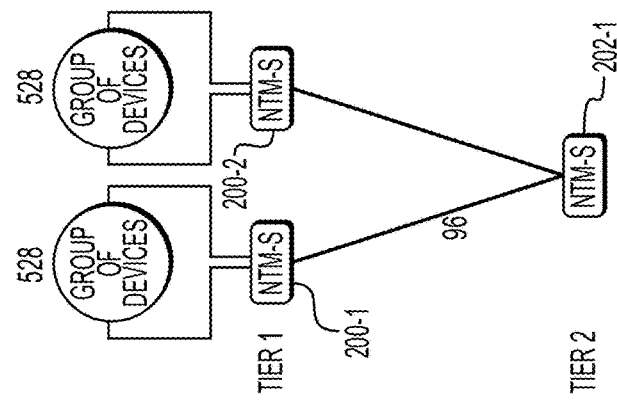
Figure 2F:
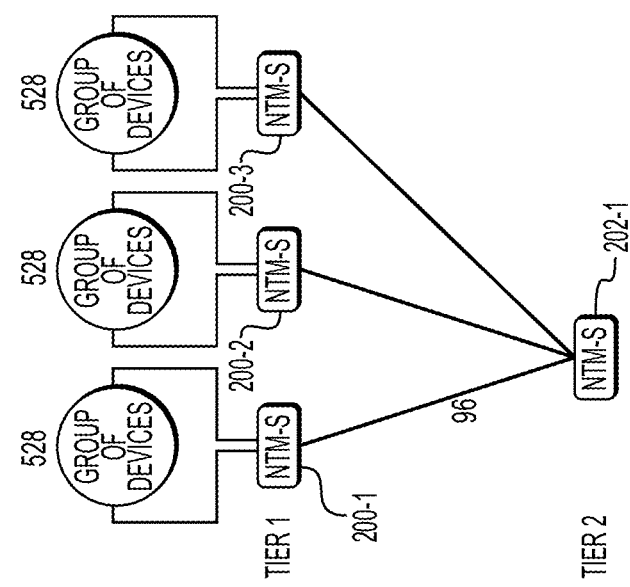
Figure 2G:
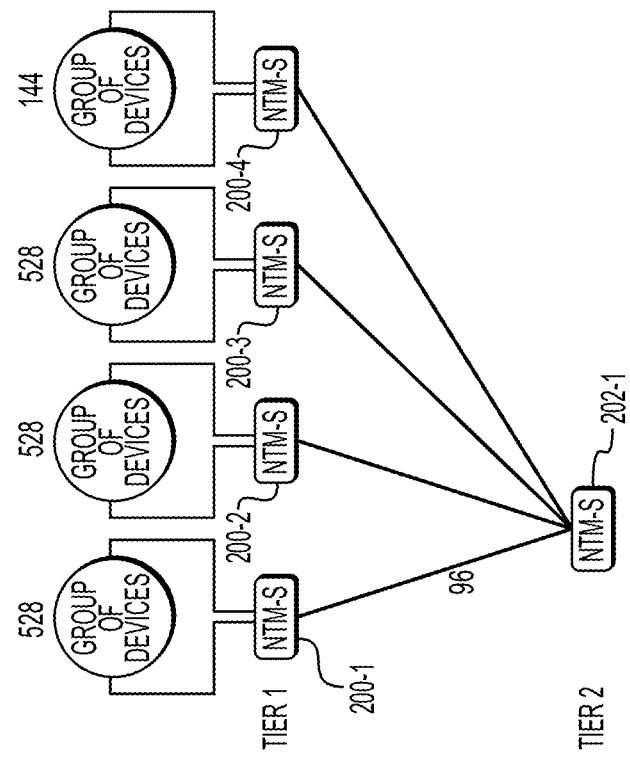
Figure 2H:
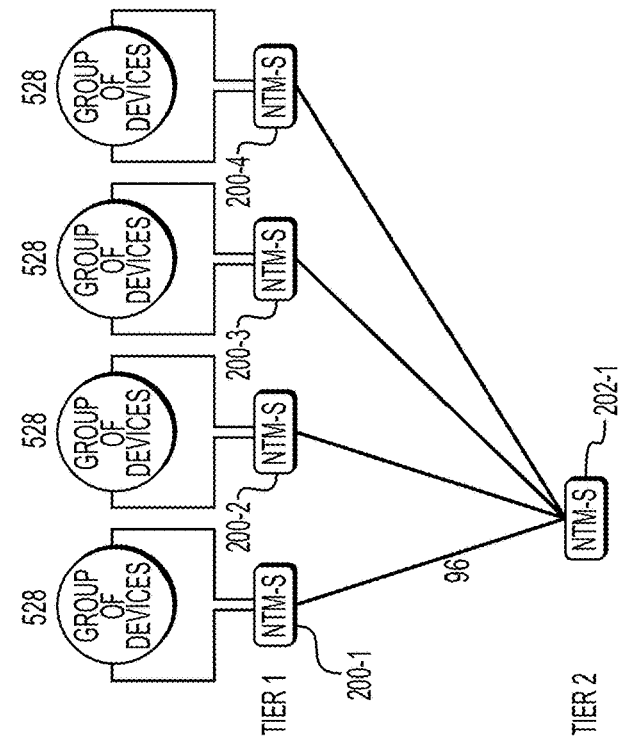
Figure 2I:
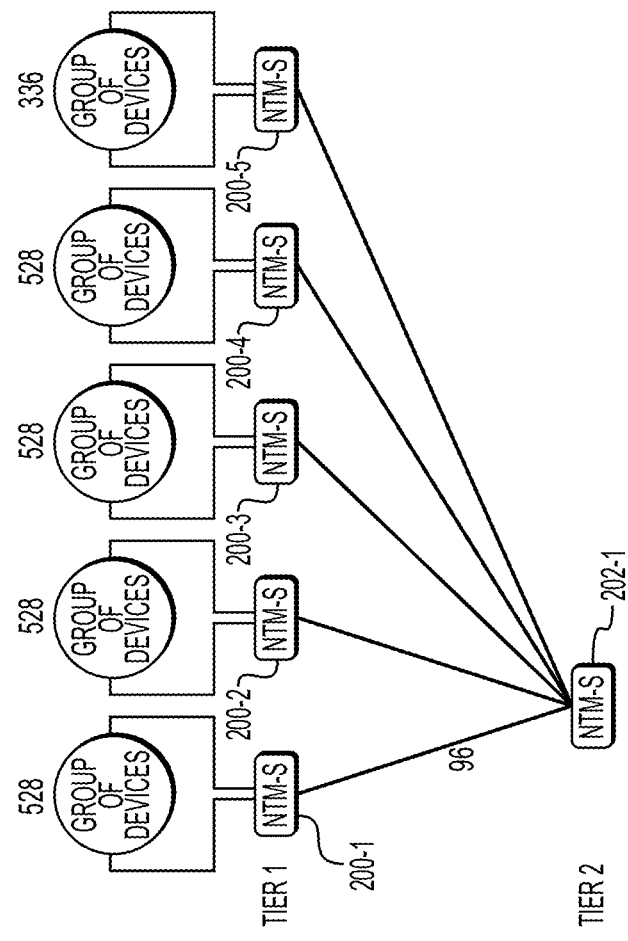
Figure 2J:
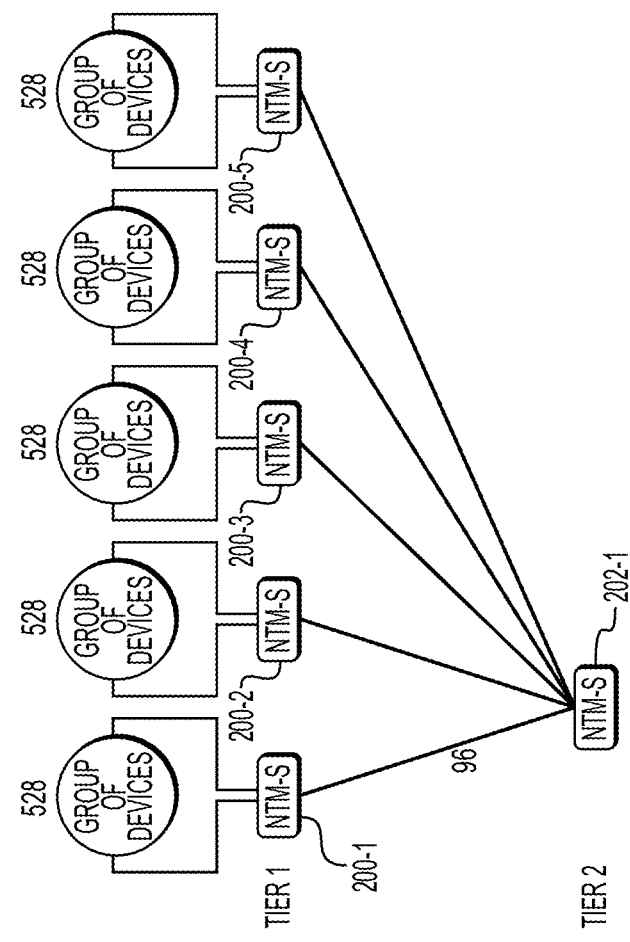
Figure 2K:
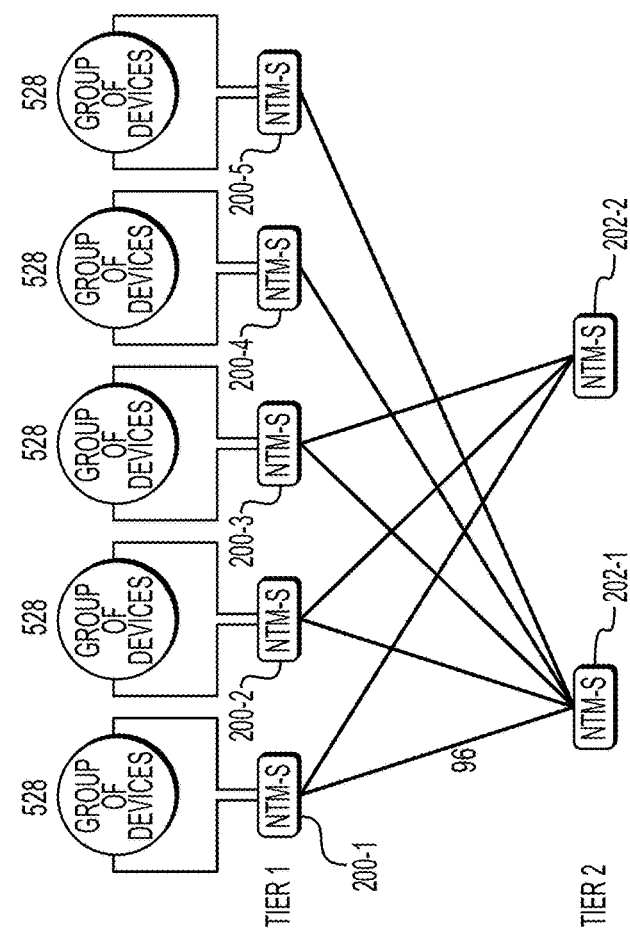
Figure 2L:
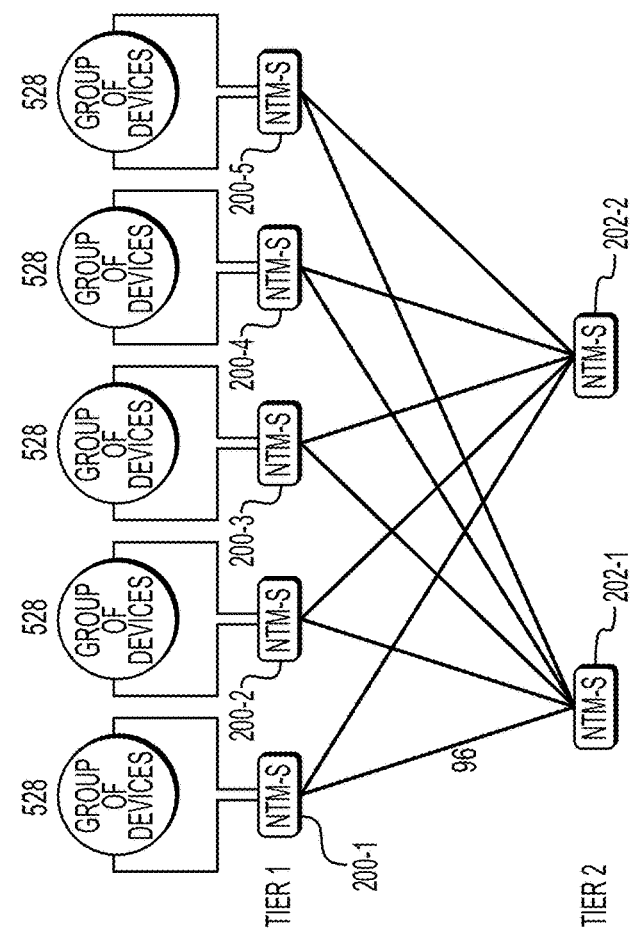
Figure 2M:
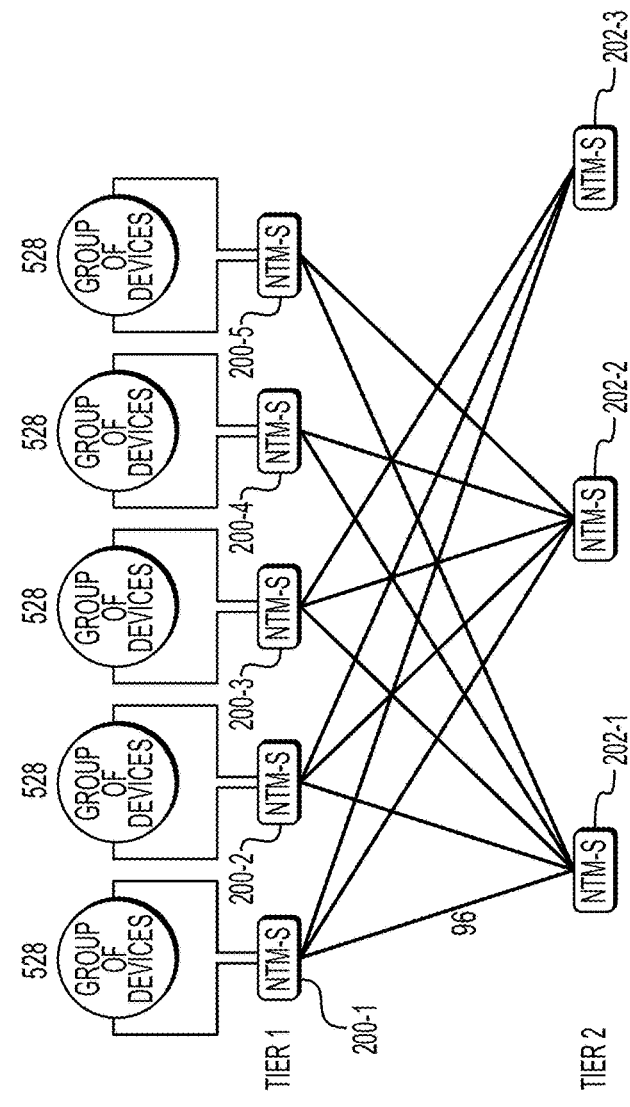
Figure 2N:
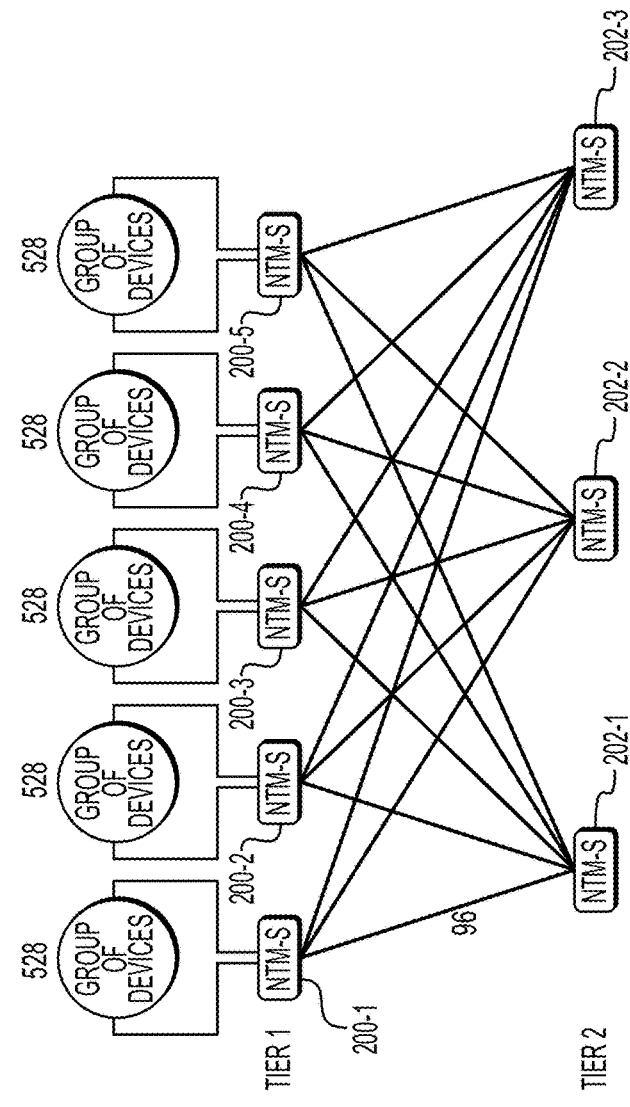
Figure 2O:
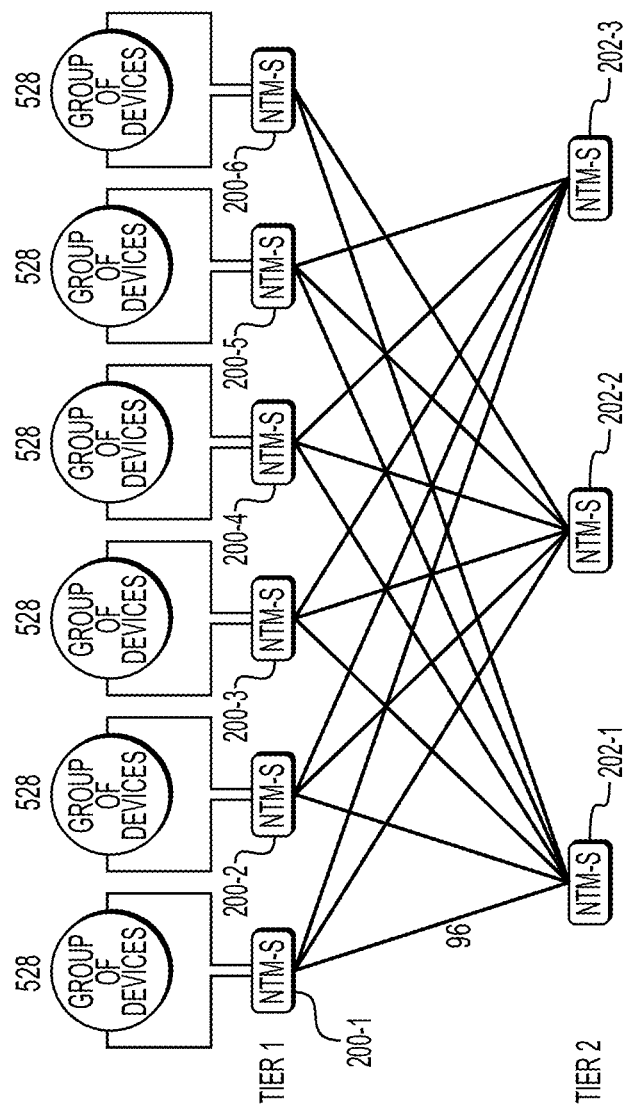
Figure 2P:
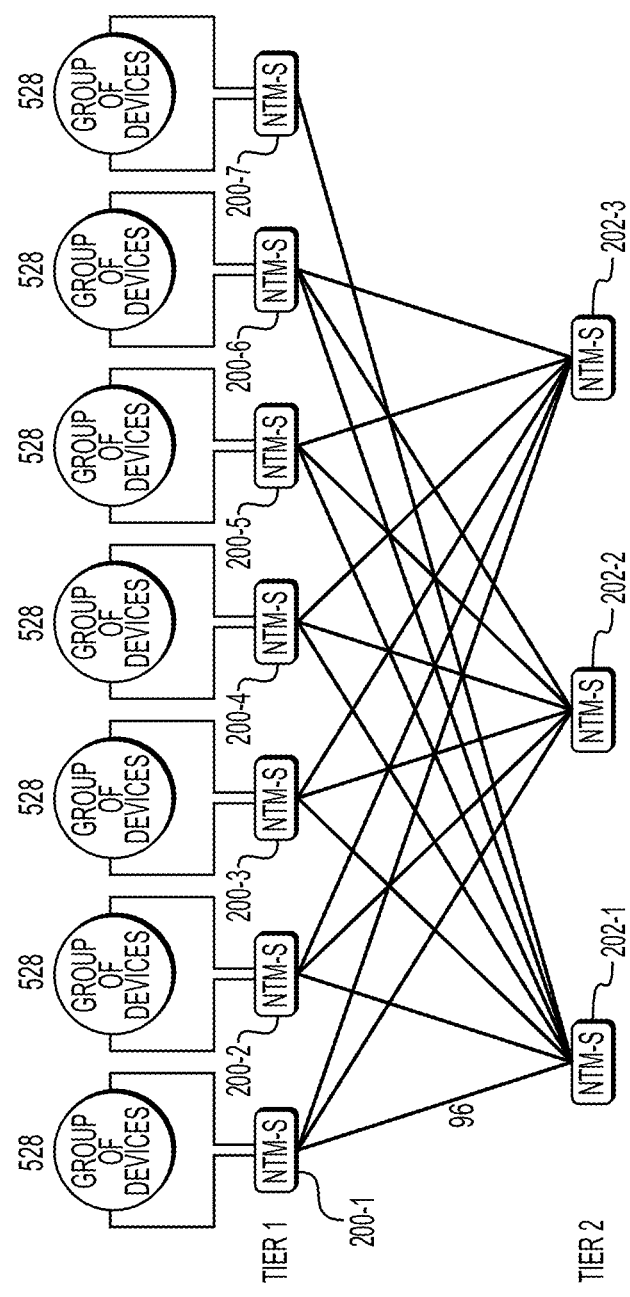
Figure 2R:
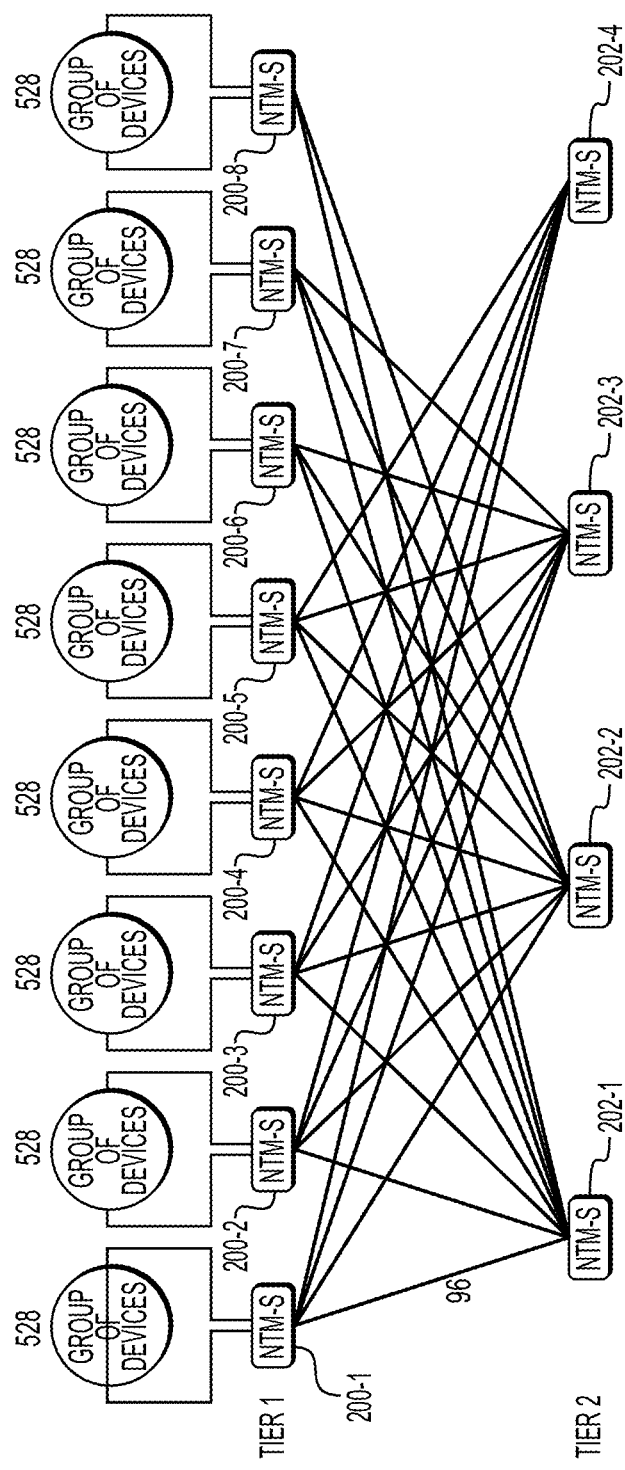
Figure 2S:
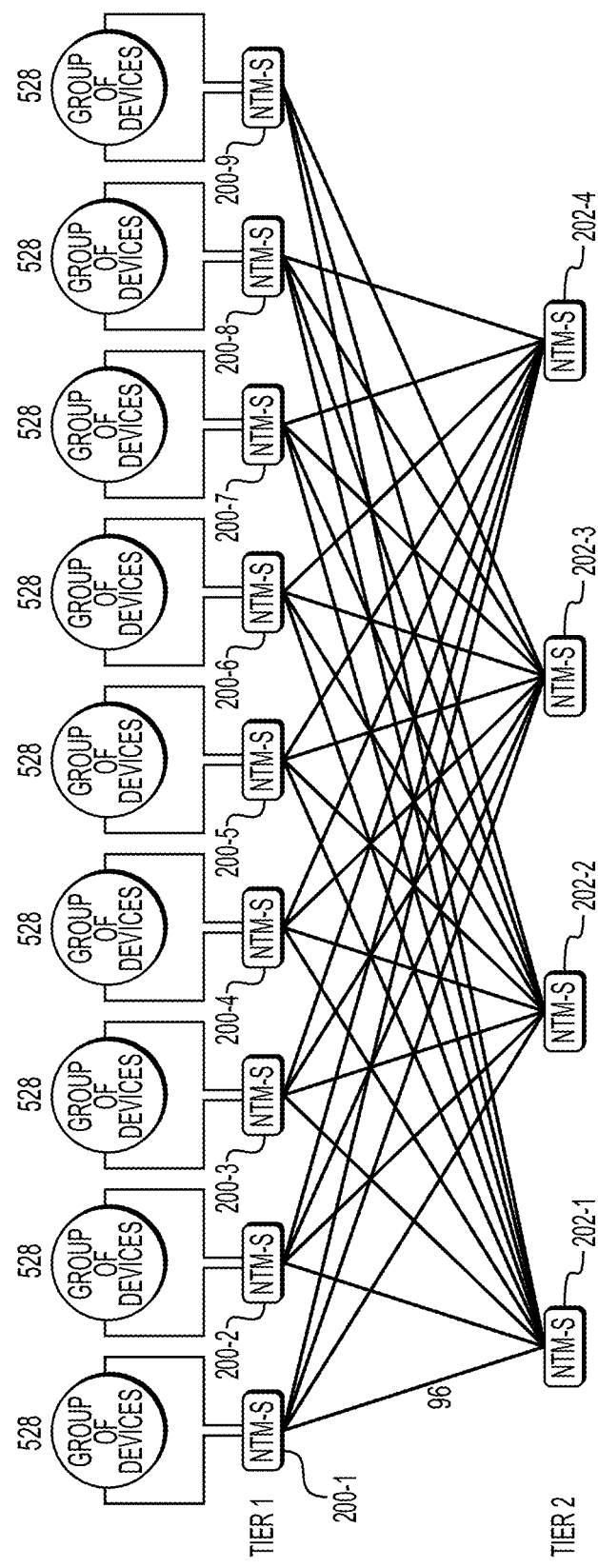
Figure 2T:
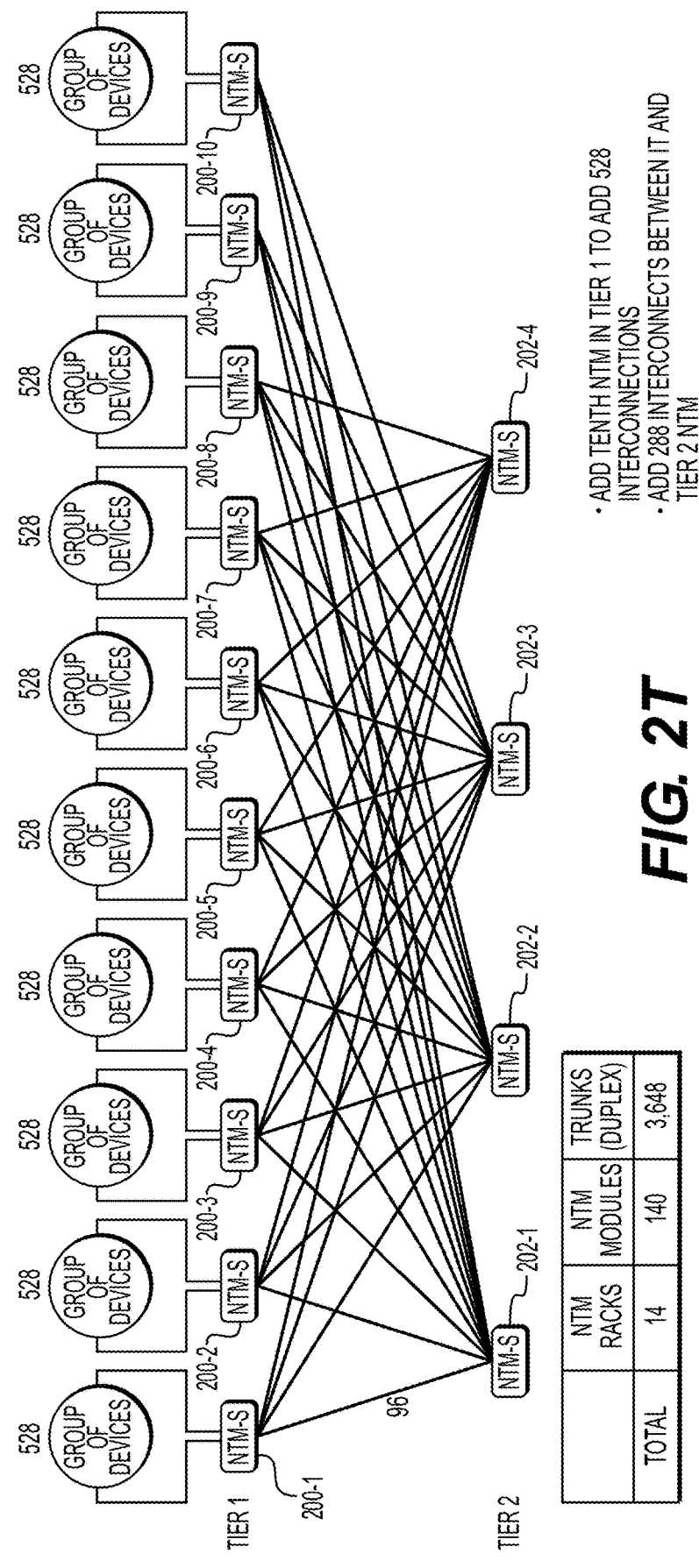
Figure 2U:
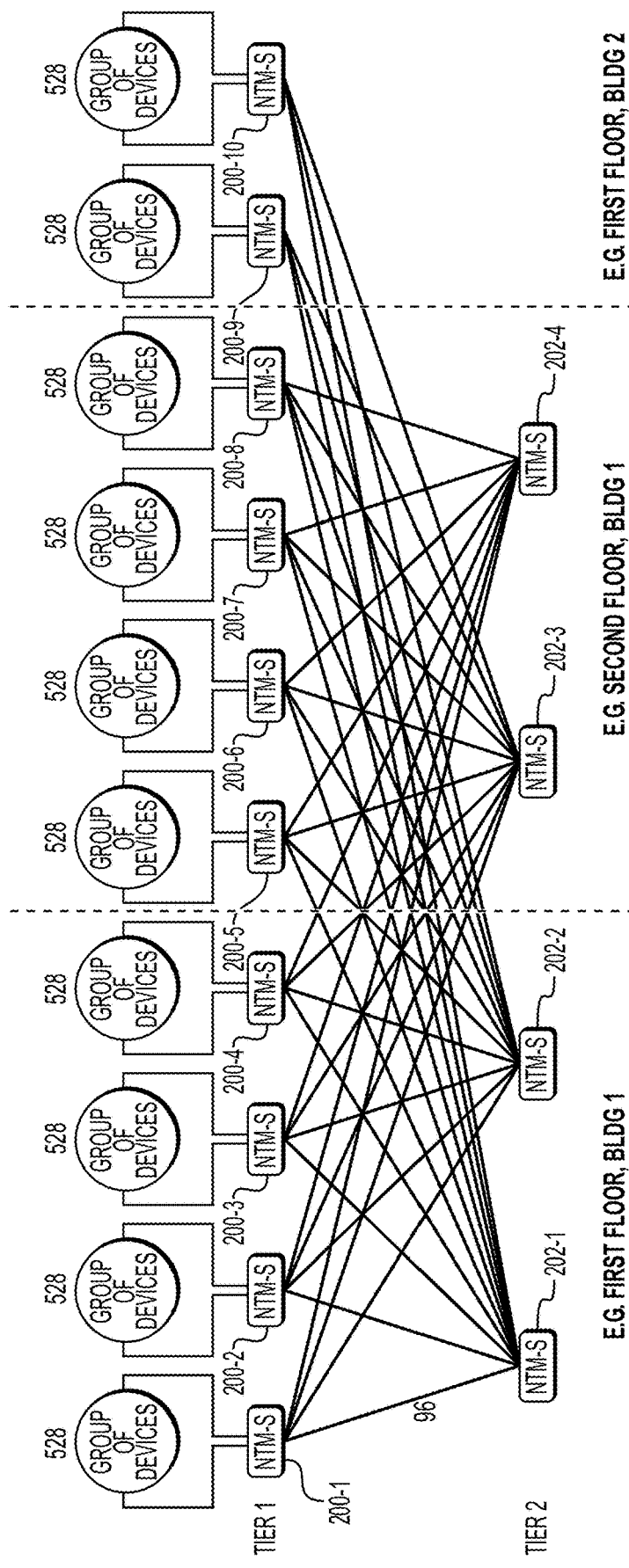
Figure 2V:
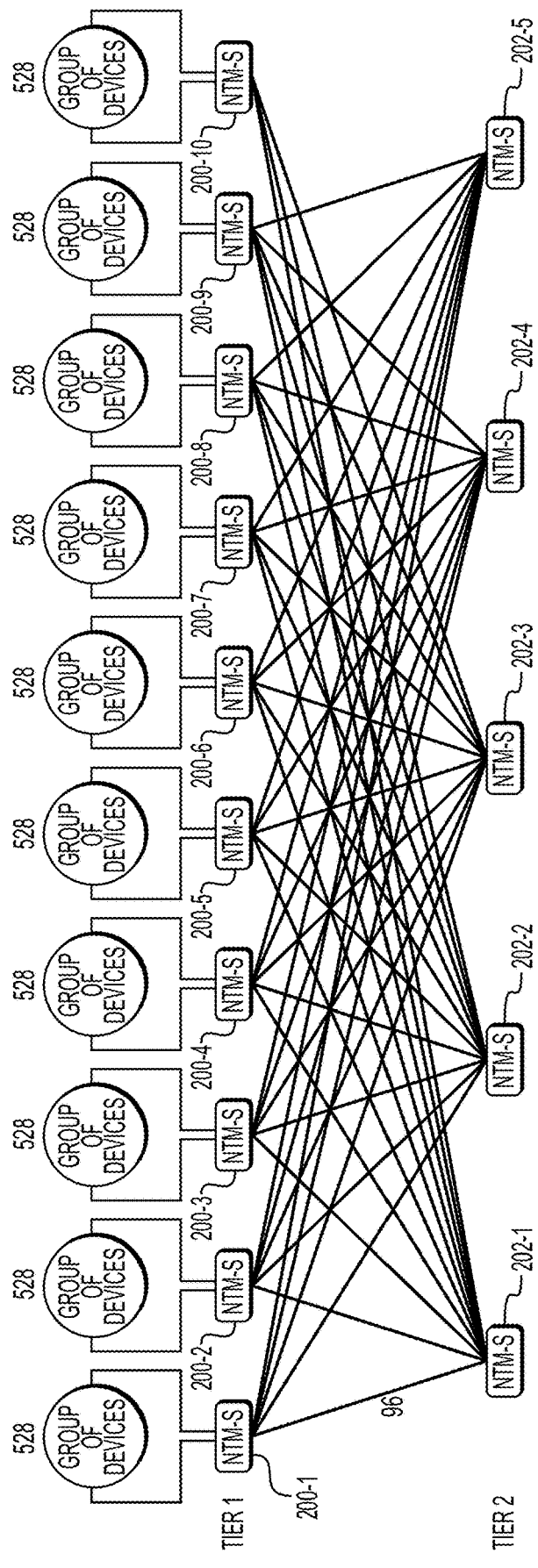
Figure 2W:
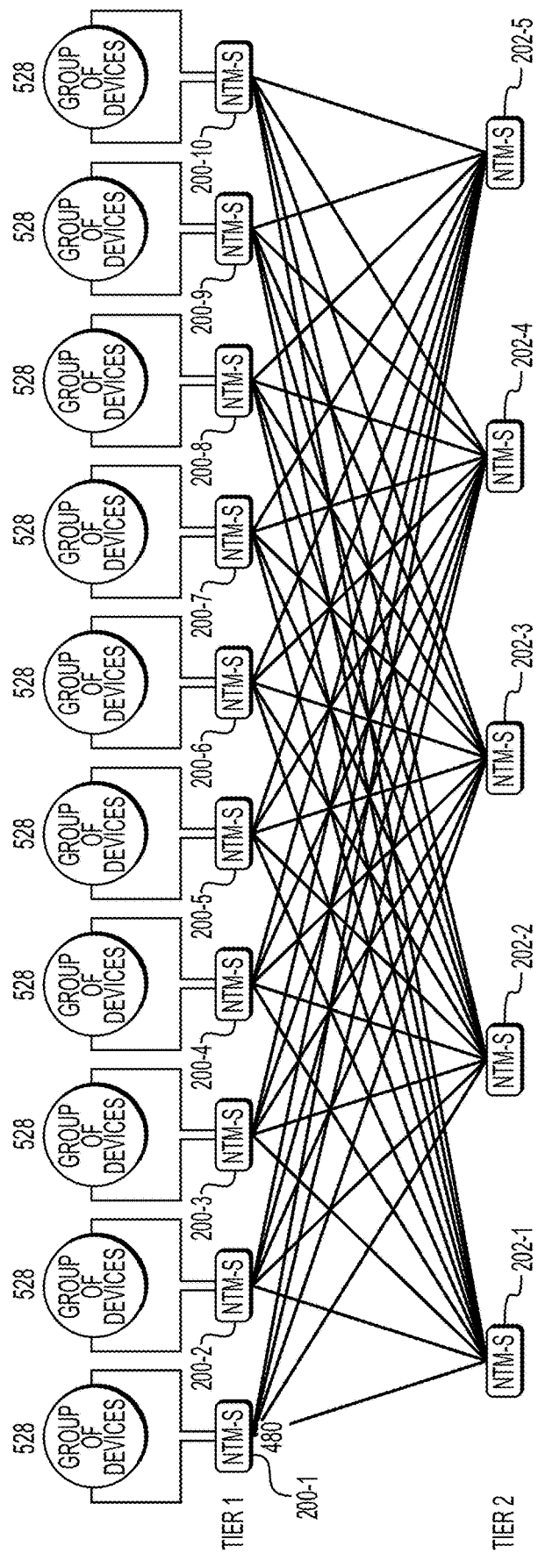

In a particular example illustrating an incremental scaling process according to exemplary embodiments hereof, FIGS. 2A-2W illustrate aspects of an exemplary process to vertically scale from 48 to 528 interconnects within a single NTM, and subsequently to scale horizontally from 528 to 5,280 interconnects across multiple NTMs. Horizontal scaling refers herein to the process of connecting separate "leaf" NTMs at the same tier through one or more "spine" NTMs at a different tier (e.g., connecting tier 1 or leaf NTMs (NTM L) through tier 2 or "spine" NTMs (NTM $S_i$)).

FIG. 2A schematically illustrates a two-tier arrangement of NTMs according to exemplary embodiments hereof to achieve 5,280 non-blocking interconnects, with 10 NTMs in tier 1 and 5 NTMs in tier 2.

FIG. 2B depicts an exemplary process of scaling up the number of interconnects according to embodiments hereof, beginning with a 48 interconnect minimally populated NTM 200-1.

FIG. 2C depicts an exemplary process of scaling up the number of interconnects according to embodiments hereof, adding five modules to the NTM 200-1 to increase the number of interconnects to 528.

FIG. 2D depicts an exemplary process of scaling up the number of interconnects according to embodiments hereof, adding a second NTM 200-2 with five modules in tier 1 to increase the number of interconnects to 1,056.

FIG. 2E depicts an exemplary buildout of NTM tier 2 according to exemplary embodiments hereof, when it is necessary to interconnect the two-tier 1 NTMs 200-1, 200-2, starting with 96 interconnects between the two-tier 1 NTMs and adding one module each to the two-tier 1 NTMs, while not interrupting service on existing live interconnections and all NTMs nominally identical and based on the same platform.

FIG. 2F depicts an exemplary process of scaling up in interconnects, adding a third NTM 200-3 with six modules in tier 1 to increase the number of interconnects to 1,584 and one module in tier 2, and adding 96 interconnections between it and tier 2.

FIG. 2G depicts an exemplary process of scaling up in interconnects, adding a fourth NTM 200-4 with two modules in tier 1 to increase the number of interconnects to 1,680 and one module in tier 2, and adding 96 interconnections between it and tier 2.

FIG. 2H depicts an exemplary process of scaling up in interconnects, adding four modules to the fourth NTM in tier 1 to increase the number of interconnects to 2,112.

FIG. 2I depicts an exemplary process of scaling up in interconnects, adding a fifth NTM 200-5 with four modules in tier 1 to increase the number of interconnects to 2,448.

FIG. 2J depicts an exemplary process of scaling up in interconnects hereof, adding two modules to the fifth NTM in tier 1 to increase the number of interconnects to 2,640.

FIG. 2K depicts an exemplary buildout of NTM tier 2 when it is necessary to interconnect tier 1 NTMs with additional interconnections, by adding a second tier 2 NTM 202-2 and cables, as necessary, in tier 2, to support more interconnections between NTMs in tier 1.

FIG. 2L illustrates addition of fiber modules and cables to support more interconnections between NTMs in tier 1.

FIG. 2M depicts addition of a third NTM 202-3 and cables in tier 2 to support more interconnections between NTMs in tier 1.

FIG. 2N depicts addition of more modules and cables in tier 2 to support more interconnections between NTMs in tier 1.

FIG. 2O depicts addition of a sixth NTM 200-6 in tier 1 to add 528 interconnections for a total of 3,168, in addition to adding 192 interconnects between it and tier 2 NTM.

FIG. 2P depicts addition of a seventh NTM 200-7 in tier 1 to add 528 interconnections for a total of 3,696 interconnections, in addition to adding 96 interconnects between it and tier 2 NTM.

FIG. 2Q depicts an exemplary system of NTMs in which NTMs in tier 1 and NTMs tier 2 may be in different locations (e.g., different floors, buildings, cities, etc.) as shown by the dashed vertical in the drawing. In this example, tier 1 NTMs 200-1, 200-2, 200-3, and 200-4 along with tier 2 NTMS 202-1, 202-2 are at a first location (e.g., the first floor of a building), while tier 1 NTMs 200-5, 200-6, and 200-7 along with tier 2 NTM 202-3 are at a second location distinct from the first location (e.g., the second floor of the building).

In general, different NTMs may be co-located or in two or more distinct locations. NTMs in one tier may be co-located with NTMs in another tier and/or in distinct locations. (See also, e.g., FIG. 2U.)

FIG. 2R illustrates addition of an eighth NTM 200-8 in tier 1 to add 528 interconnections for a total of 4,224 interconnections, and add 192 interconnects between it and tier 2 NTMs.

FIG. 2S illustrates addition of a ninth NTM 200-9 in tier 1 to add 528 interconnections for a total of 4,752 interconnections, and add 288 interconnects between it and tier 2 NTMs.

FIG. 2T illustrates addition of tenth NTM 200-10 in Tier 1 to add 528 interconnections for a total of 5,280 interconnections, and the addition of 288 interconnects between it and tier 2 NTMs.

FIG. 2U illustrates deployment of individual NTMs of the system deployed on different floors, buildings, cities, etc.

FIG. 2V illustrates addition of NTM 202-5 and cables in tier 2 to support more interconnects between tier 1 NTMs.

FIG. 2W illustrates a full build out according to exemplary embodiments hereof of modules and cables in tier 2 to fully support interconnects between tier 1 NTMs, with 480 interconnects between each NTM of tier 1.

In principle, while tier 1 NTMs $L_1, L_2, \ldots L_N$ may be configured so that all interconnections in tier 1 pass through some number of tier 2 NTMs $S_i$, ($i \geq 1$), in practice a majority of interconnection paths remain within a single tier 1 device. The fraction of interconnections (defined herein as "local") that remain within a tier 1 NTM is denoted by x %, and the fraction that pass to tier 2 (defined herein as "express") is denoted by (100-x) % for some value x.

Those interconnects that remain within tier 1 pass through only 1 NTM (2 ports), while those that pass from tier 1 to tier 2 and back to tier 1 pass through 3 NTMs (6 ports in total). Therefore, while a Clos architecture (discussed above) requires 6 ports per interconnect, the NTM architecture requires 6 x (1-x) ports per interconnect. Assuming x is 50% on average, the number of NTM ports is 3 on average. In this case, each tier 1 NTM is configured with 75% user ports and 25% trunk ports, versus the more costly 50% user ports and 50% trunk ports. This reduced port consumption relative to the Clos architecture, while retaining full non-blocking connectivity, has significant performance and cost benefits.

There are many specific examples of this two-tier NTM fabric dependent on the use case and port requirements. However, in all cases this unique two-tier NTM architecture exhibits some or all of the following key attributes:

Non-blocking, no partitioning of physical interconnects

Fully arbitrary, any-to-any connectivity

No need for physical grooming or migration, which would entail the disconnect of physical interconnects No interruption of service when increasing the number of ports in the two-tier NTM fabric Interconnects may be added in 96 interconnect increments to scale with network growth.

Any-to-any, non-blocking connectivity is important to eliminate physical partitioning of the interconnect fabric, because partitioning can add significant management complexity as it limits the ability of certain user ports to connect to other user ports in an automated fashion. For example, a 250-port cross-connect unit consisting of two separate, physically partitioned 125 port cross-connects would not allow fiber connections to be made between say, port 1 and port 250. Circumventing physical partitions would lead to the need for manual intervention and potentially service disrupting grooming. The system designs and scaling procedures presented herein overcome this problem.

Figure 3A:
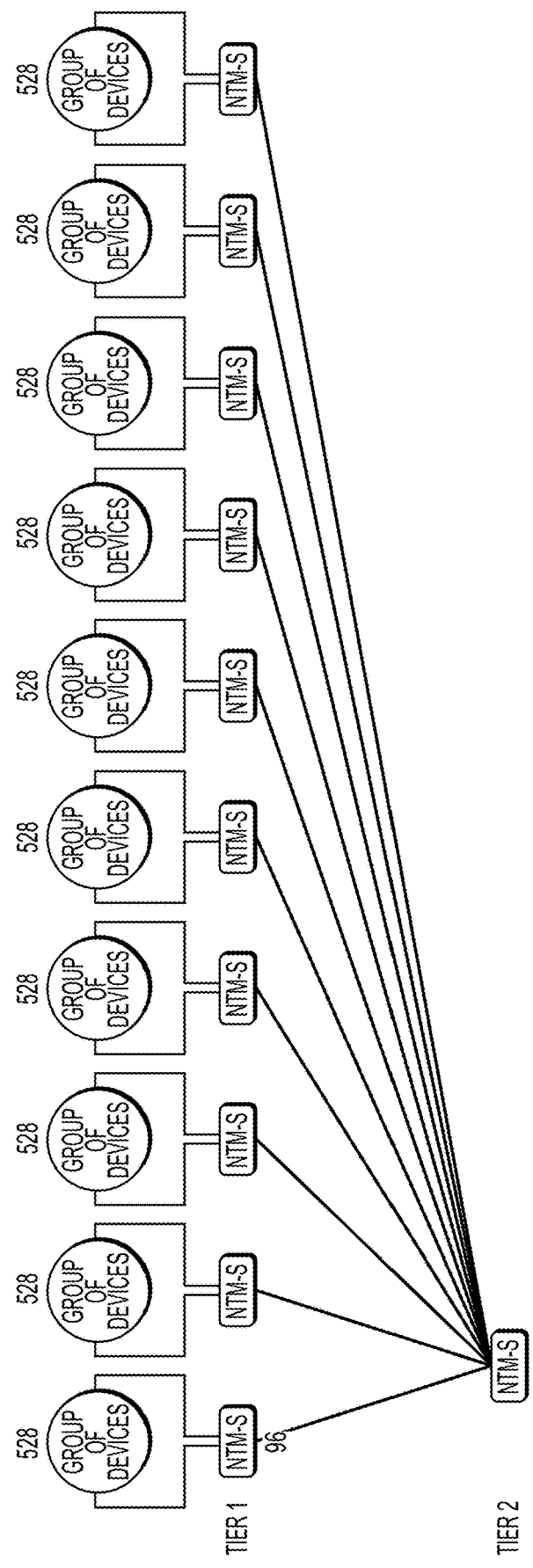
FIGS. 3A-3C depict aspects of an example interconnect system according to exemplary embodiments hereof.
Figure 3B:
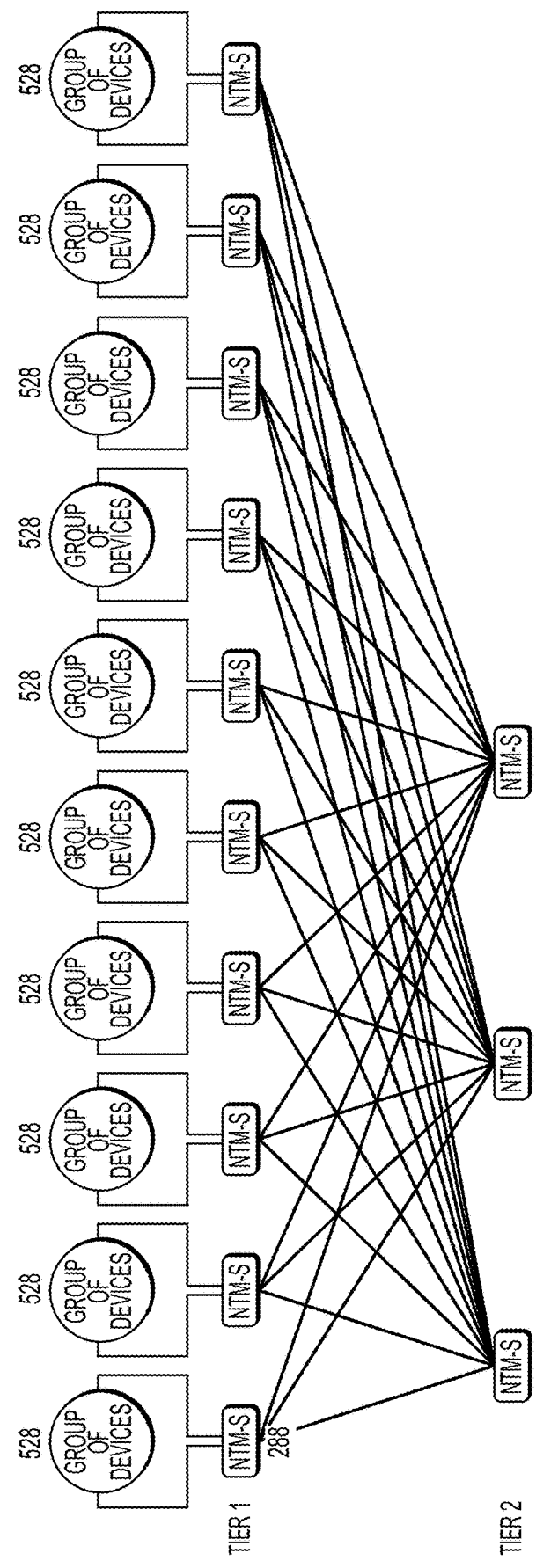
Figure 3C:
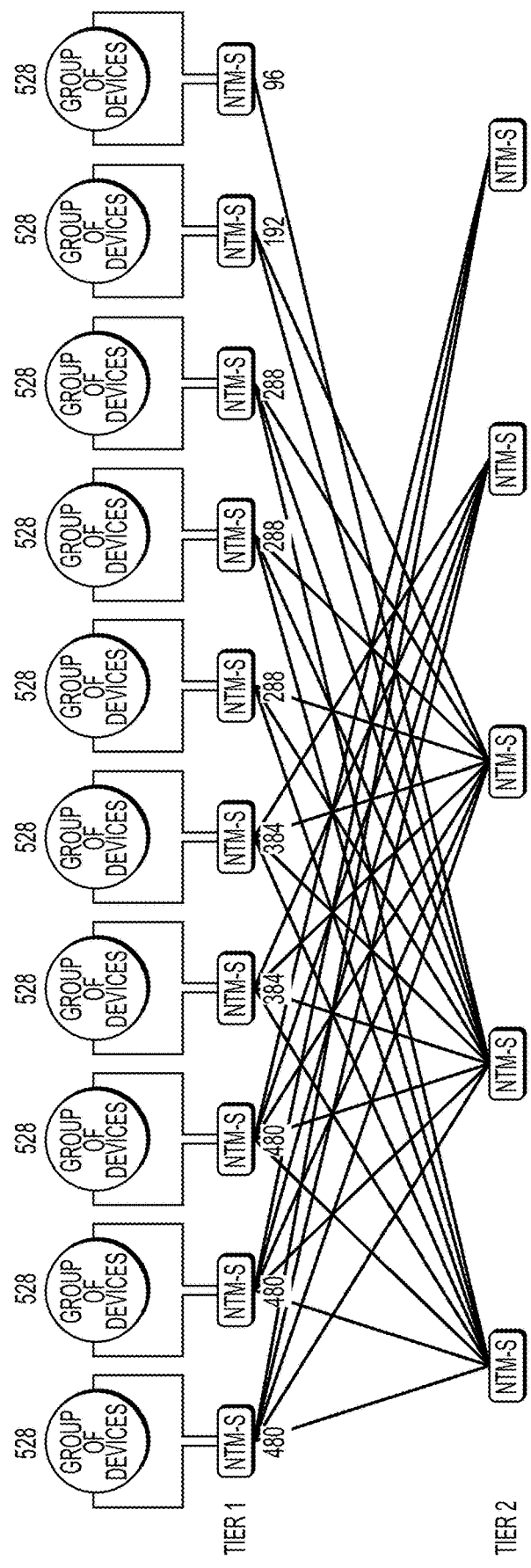

FIGS. 3A-3C depict aspects of an example interconnect system according to exemplary embodiments hereof.

FIG. 3A depicts a 5,280-interconnect system according to exemplary embodiments hereof with 96 interconnects between each NTM of tier 1. FIG. 3B depicts a 5,280-interconnect system according to exemplary embodiments hereof with 288 interconnects between each NTM of tier 1. FIG. 3C depicts a 5,280-interconnect system according to exemplary embodiments hereof with a combination of 480, 384, 288, 192 and 96 interconnects between each NTM of tier 1.

The multi-tier NTM system and method of scaling as disclosed herein provides full flexibility in terms of the number of inter-NTM connections (FIGS. 3A-3C), based on the number required for end users. Only the number of interconnections necessary to support projected user port growth over a certain time frame need to be installed initially. This flexibility is important because it enables upfront costs to be managed. It enables network operators to track their growth in fiber connectivity without requiring a massive overbuild of interconnections/cross-connections on day one. This provides a simple and compelling scaling approach without complex capacity planning and forecasting. In the particular examples illustrated in FIGS. 3A-3C, the scaling process is based on a few rules:

1. Connect up to 528 devices on any NTM in tier 1, corresponding to five 96 interconnect modules in addition to 48 interconnects in the base system.
2. When interconnections on an NTM in tier 1 are fully exhausted at 528 devices, an additional NTM is added to tier 1.
3. When interconnections are needed between separate NTMs in tier 1, install additional fiber modules in NTM(s) and/or an NTM in tier 2 to support the connections between NTM pairs in tier 1 (up to 480 express connections between NTMs may be installed).
4. To ultimately scale to 5,280 devices, install modules and tier 1 to tier 2 interconnect cables in multiples of 96 as needed.
5. To ultimately scale to 10,560 devices, install modules and tier 1 to tier 2 interconnect cables in multiples of 48 as needed.
6. To ultimately scale to 21,020 devices, install modules and tier 1 to tier 2 interconnect cables in multiples of 24 as needed.
7. To ultimately scale to 42,040 devices, install modules and tier 1 to tier 2 interconnect cables in multiples of 12 as needed.

This particular example assumes that 528 user ports per NTM are connected to tier 1 devices, leaving 480 trunk ports to potentially connect to tier 2 (For this example, each NTM has 1,008 ports in total). Therefore, this particular example supports growth from 0% express connections up to 480/528=91% express connections. Depending on the particular data center operator's interconnectivity requirements, the number of user ports may be increased from 528 to, for example, 720 user ports. This is advantageous because it reduces the tier 1 ports consumed by the trunk lines and it reduces the number of tier 2 ports connected to these trunk lines, thereby reducing the overall cost and footprint of the two-tier NTM interconnect fabric.

This incremental scaling process provides for flexible buildout of tier 2 based on scaling requirements and inter-NTM demand to avoid blocking. The primary determination is what total user port count is to be supported. This then dictates the number of tier 2 NTMs and the maximum number of fiber interconnects P within the trunk lines going from any tier 1 NTM to any tier 2 NTM.

In a further example, tier 2 connections may be deployed as needed in blocks of 96 interconnects. This eliminates need to pre-deploy an excess number of interconnects. This particular example with 96 interconnect fiber modules scales gracefully to 5,280 user ports. The alternative examples above may be implemented to scale to 10,560, 21,020 and 42,040 user ports and beyond.

In a more generalized example, the process to scale a system of NTMs, each NTM with N ports, to a total of M user ports is based on:

1. For an NTM $L_1$ with N ports, connect up to N/2 devices on NTM $L_1$ in tier 1,
2. When interconnections on an NTM $L_1$ in tier 1 are fully exhausted at N/2 devices, an additional NTM $L_2$ is added to tier 1 with capacity for an additional N/2 devices.
3. When interconnections are needed between separate NTMs $L_1$, $L_2$ in tier 1, an additional P fiber interconnects are installed in NTM $L_1$, an additional P fiber interconnects are installed in NTM $L_2$, an additional 2P fiber interconnects are installed in NTM $S_1$ in tier 2, and an additional P fiber trunk lines are installed between NTM $L_1$ and NTM $S_1$ and an additional P fiber trunk lines are installed between NTM $L_2$ and NTM $S_1$, where $P=N^2/2M$ connections.
4. The maximum number of NTMs in tier 2=2 M/N.

Tables 1 and 2 below illustrate representative calculations for different example configurations. Note that parameter P should be rounded up to the nearest integer number of fibers.

TABLE 1

| N (Ports per NTM) | M (Total Number of User Ports) | P (Fibers per Trunk Line) | Absolute Max Number of NTMs in Tier 2 |
|---|---|---|---|
| 960 | 4,800 | 96 | 10 |
| 960 | 9,600 | 48 | 20 |
| 960 | 19,200 | 24 | 40 |
| 960 | 38,400 | 12 | 80 |
| 1,000 | 5,000 | 100 | 10 |
| 1,000 | 10,000 | 50 | 20 |
| 1,000 | 20,000 | 25 | 40 |
| 1,000 | 40,000 | 12.5 | 80 |
| 1,000 | 80,000 | 6.25 | 160 |
| 1,000 | 160,000 | 3.125 | 320 |
| 2,000 | 10,000 | 200 | 10 |

Example: N=1,000 ports per NTM, M=5,000 ports per Multi-NTM System

TABLE 2

| X% (Local) | Number of Tier 1 Ports | Number of Tier 2 Ports | Total Number of Ports (Tier 1 + Tier 2) |
|---|---|---|---|
| 100% | 5,000 | 0 | 5,000 |
| 90% | 5,500 | 500 | 6,000 |
| 80% | 6,000 | 1,000 | 7,000 |
| 70% | 6,500 | 1,500 | 8,000 |
| 60% | 7,000 | 2,000 | 9,000 |

TABLE 2-continued

| X% (Local) | Number of Tier 1 Ports | Number of Tier 2 Ports | Total Number of Ports (Tier 1 + Tier 2) |
|---|---|---|---|
| 50% | 7,500 | 2,500 | 10,000 |
| 40% | 8,000 | 3,000 | 11,000 |
| 30% | 8,500 | 3,500 | 12,000 |
| 20% | 9,000 | 4,000 | 13,000 |
| 10% | 9,500 | 4,500 | 14,000 |
| 0% | 10,000 | 5,000 | 15,000 |

In this particular example, the individual native duplex NTM is any-A-to-any-B rather than the more general any-A-to-any-A, where A and B refer to a grouping of devices attached thereto. Any-A-to-any-A connectivity is the most general, without requiring that A devices can only connect to B devices. As a consequence, this requires a different scaling methodology compared to previous example, one that requires at least partial build-out of tier 2 on day 1 to provide the loopback interconnects that allow A devices to be connected to other A devices.

Figure 7:
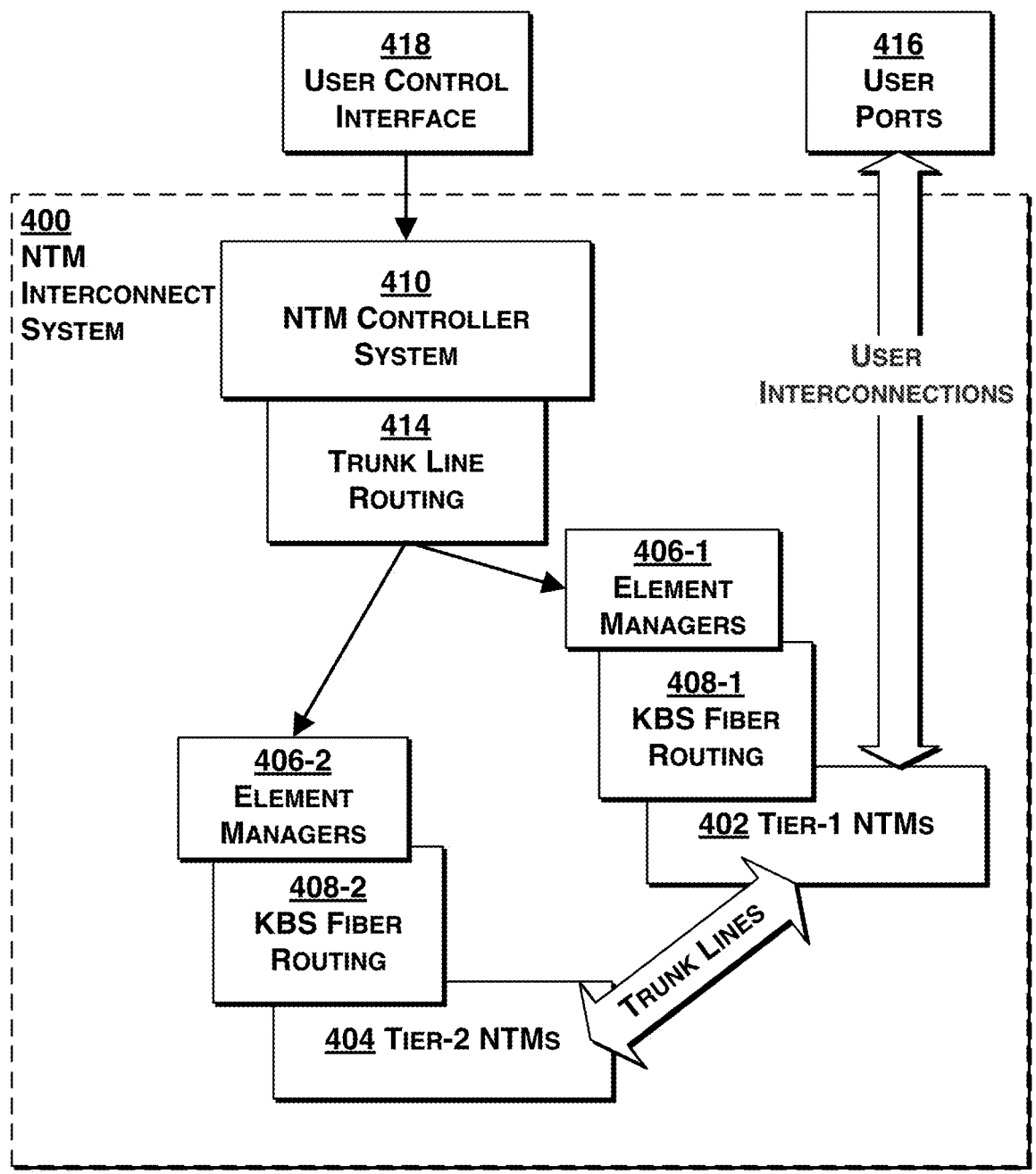
FIG. 7 is a block diagram of a system and controller according to exemplary embodiments hereof.

FIG. 7 is a block diagram of a large, incrementally scalable NTM interconnect system 700 according to exemplary embodiments hereof. The system 700 comprises one or more tier 1 NTMs 702 and one or more tier 2 NTMs 704. Each NTM of each tier has an associated Element Manager 706-1, 706-2 (generally referred to as Element Manager 706) with KBS fiber routing engine 708-1, 708-2 (generally referred to as KB S Fiber Routing engine 708) to control the movement of a robot when moving a selected internal fiber interconnect. The NTM interconnect system 700 has an NTM System Controller 710 which selects and determines the connectivity of a trunk lines 712 within the NTMs at either end of each trunk line using the Trunk Line Routing Engine 714. The Trunk Line Routing Engine 714 determines an optimal path through the series of NTMs to minimize a user specified cost function (e.g. minimum insertion loss, minimum number of hops, minimum latency, minimum utilization, etc.). Reconfiguration instructions generated by the NTM System Controller 710 are send to the Element Managers 706 of the particular NTMs that must be reconfigured. A desired configuration of user ports 716 is input through the User Control Interface 718, which sends instructions to the NTM System Controller 710.

Figure 8:
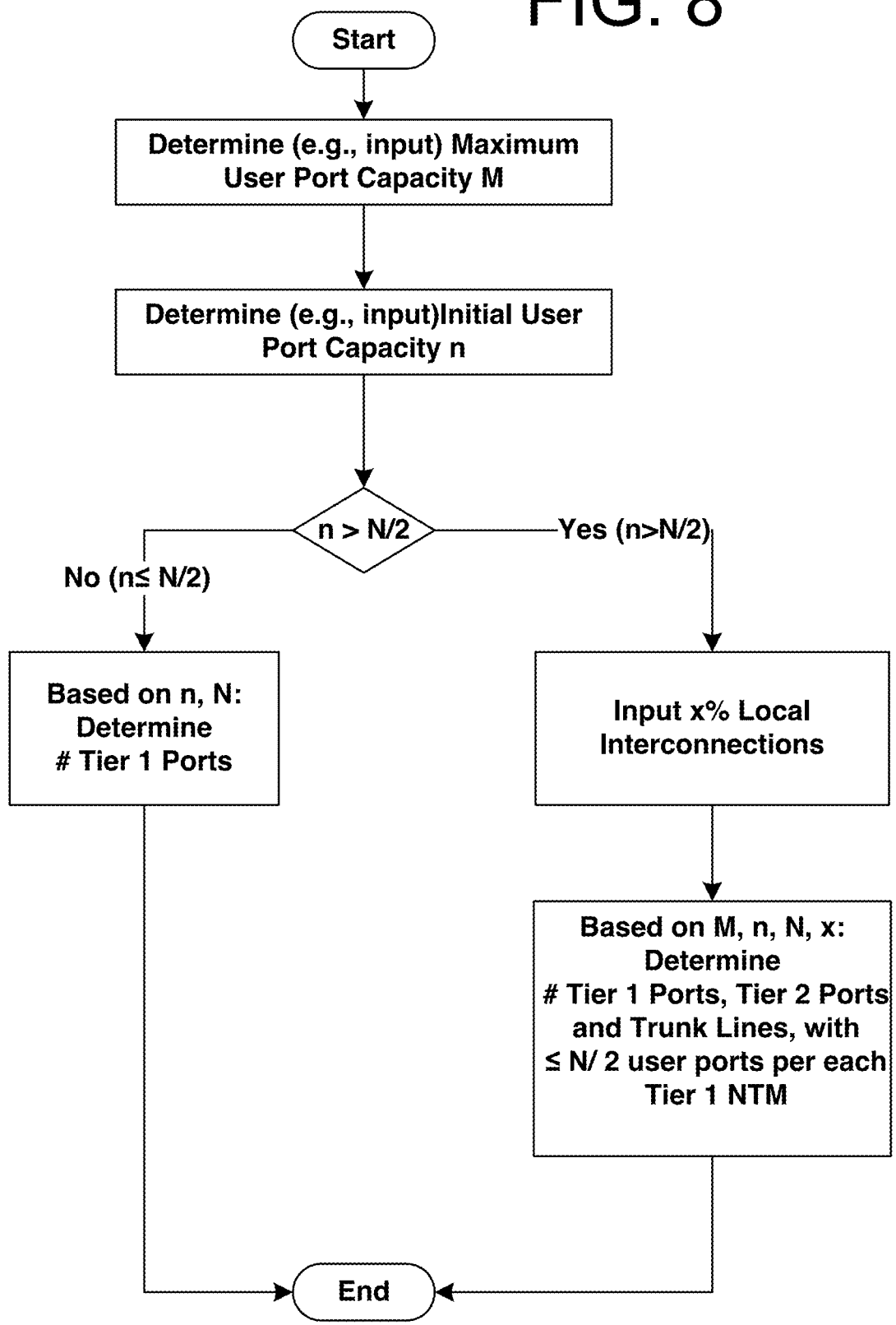
FIG. 8 is a block diagram of aspects of an exemplary incremental deployment process of an NTM interconnect system according to embodiments hereof.

FIG. 8 is a block diagram of an incremental deployment process of the interconnect fabric according to exemplary embodiments hereof, based on the parameters M, N, x, n, wherein M is the maximum user port capacity, N is the number of ports per NTM, x is the percentage of user ports that remain local to a single tier 1 NTM, and n is incremental number of user ports to be installed.

EXAMPLE 3

Increased NTM Interconnect Density with Small Form Factor Fibers

Figure 4:
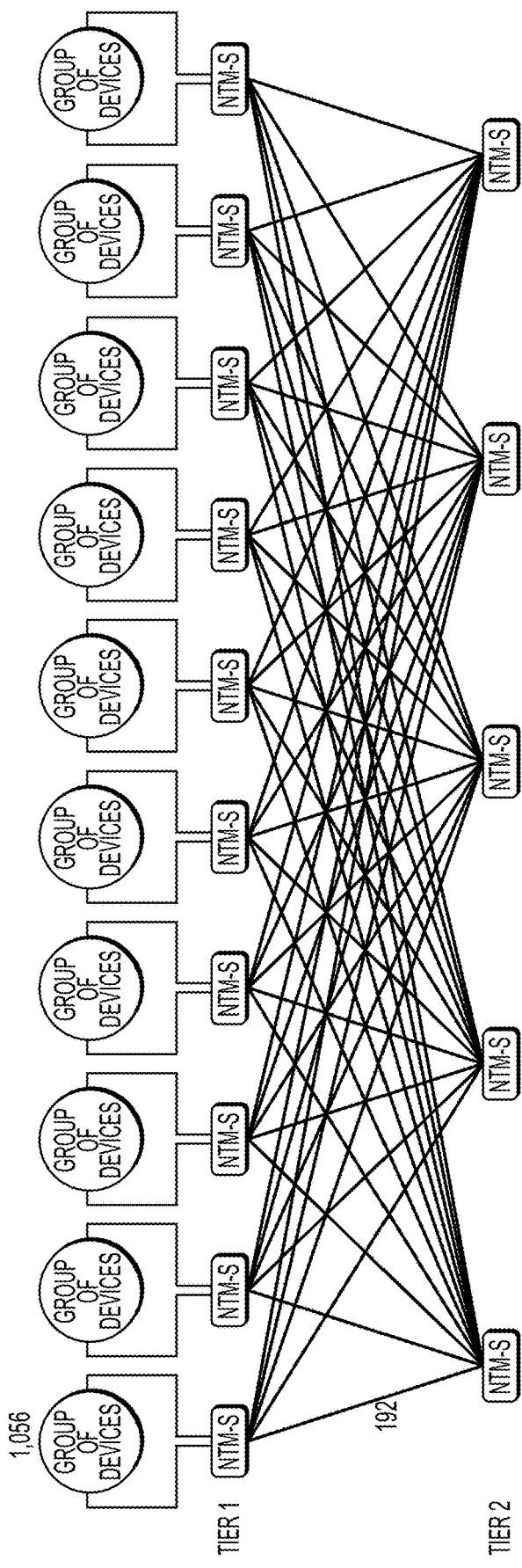
FIG. 4 illustrates an alternative system of NTMs according to exemplary embodiments hereof, scaling to 10,560 interconnects, with each NTM having 2,016 interconnects with any-to-any connectivity.
Figure 5:
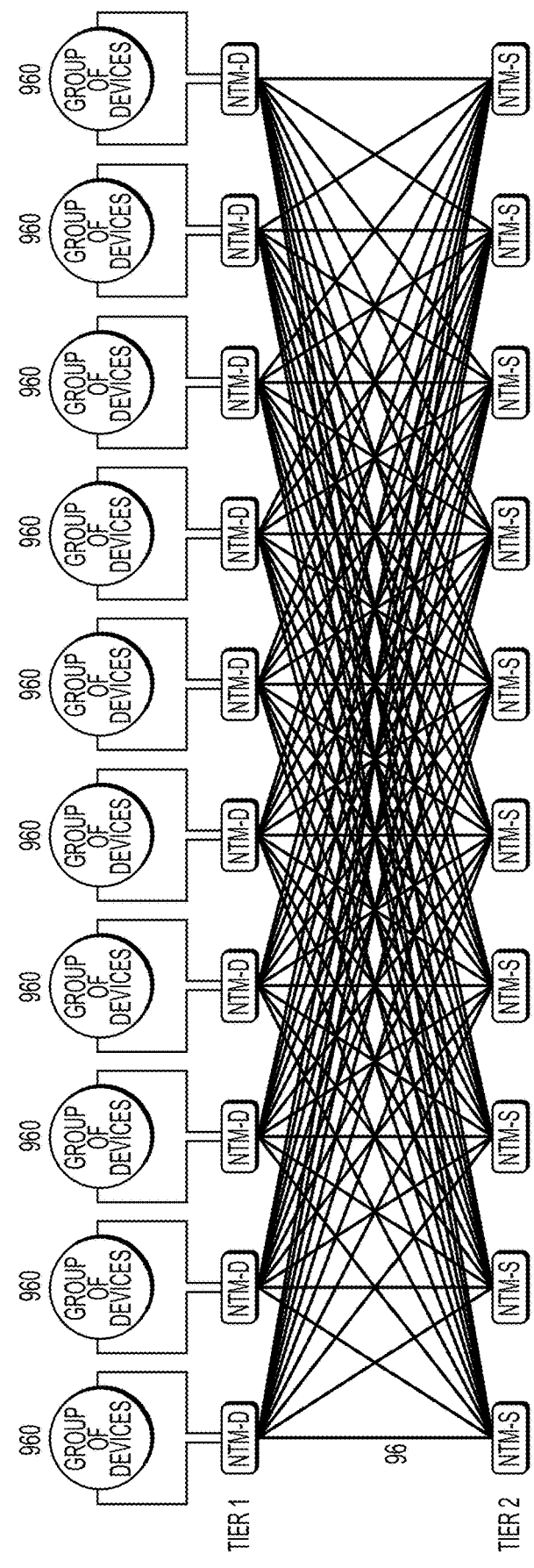
FIG. 5 illustrates an alternative system of NTMs according to exemplary embodiments hereof, scaling to 9,600 interconnects, with each NTM-D having 2,016 interconnects with any A to any B connectivity.

A further example shows aspects of a design to increase the density of an individual NTM robotic cross-connect unit and thereby support additional user ports within a single unit, and by extension a system of such units. The capacity of an individual NTM unit is limited by its height and the vertical stacking height of optical fiber based on the outer diameter of the optical fiber internal to each fiber module. The nominal stacking height of each fiber at the internal one-dimensional backbone is 1 mm and for reduced form factor fiber this may be reduced to about 0.5 mm. For 1,008 fibers, the height of the internal one-dimensional backbone of flexible fiber guide tubes (each tube with about 1 mm outer diameter) within the individual NTM unit is approximately 1,008 mm. By reducing the size of the fiber to 125 microns, the one-dimensional backbone may be made using smaller 0.5 mm outer diameter flexible guide tubes. The 1,008 mm backbone distance can then support up to 2,016 independent fibers. This unit is called the native simplex NTM with small form factor fiber and is illustrated in FIG. 4.

In a particular example of 2,016×2,016 any-to-any, fully non-blocking interconnects, the width of the NTM is about 50 inches and the connector array at which the robot reconfigures is comprised of 24 rather than 12 columns. The small form factor optical fiber has, for example, an 80-micron outer diameter glass cladding and a 125-200-micron outer diameter polymer coated fiber. This system incorporates LC or other small form factor connectors. In this case, expansion fiber modules have twice the capacity for a given vertical height; for example, 192×192 interconnections within about 10 cm. Therefore, this NTM provides any-to-any, non-blocking connectivity with a factor of two increase in interconnections.

EXAMPLE 4

Figure 6A:
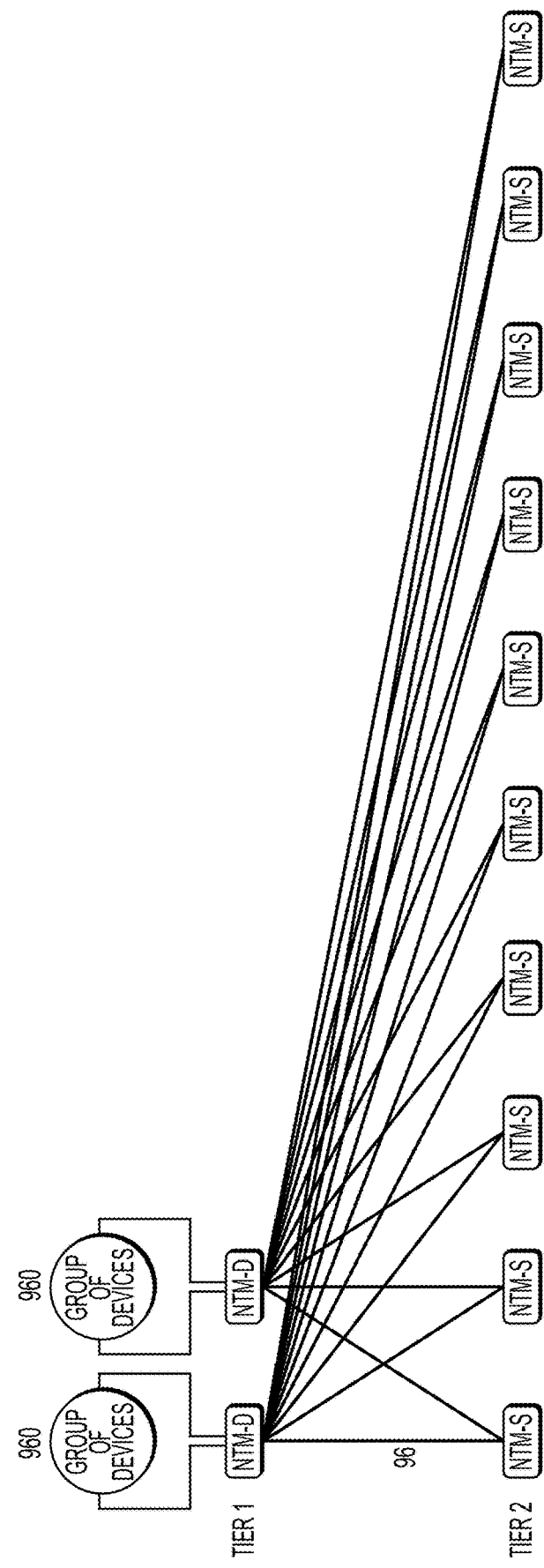
FIG. 6A illustrates aspects of an approach according to exemplary embodiments hereof to scaling system with duplex port NTM-D, in which the second tier is built out with partially populated simplex port NTM-S to provide any-to-any connectivity even though NTM-D are any A to any B.
Figure 6B:
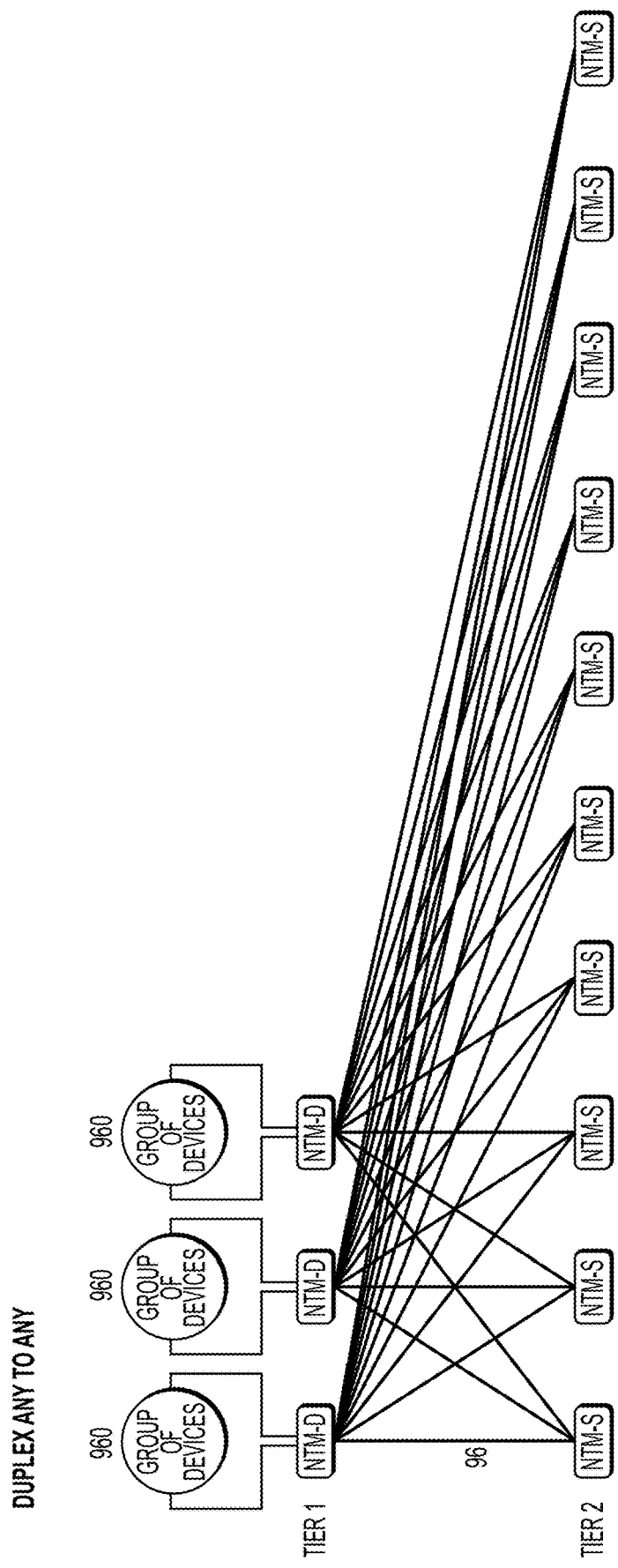
FIG. 6B illustrates aspects of the system of FIG. 6A scaled to 2,880 interconnections according to exemplary embodiments hereof.
Figure 6C:
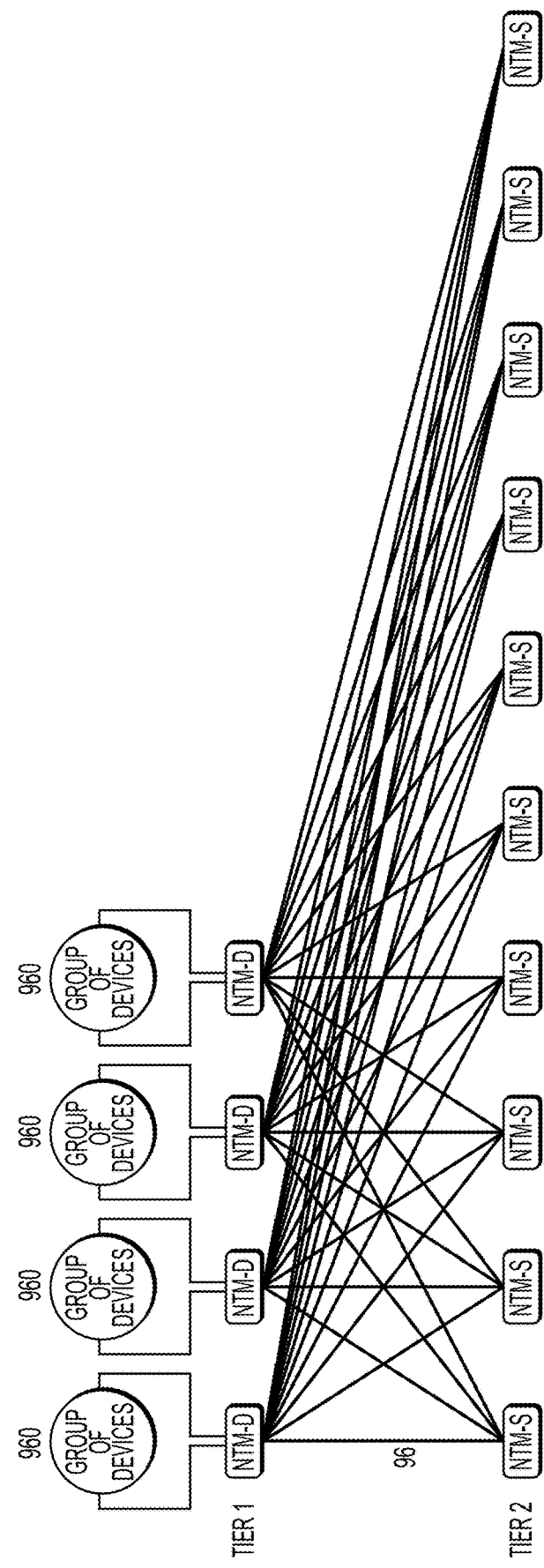
FIG. 6C illustrates aspects of the system of FIG. 6A scaled to 3,840 interconnections.
Figure 6D:
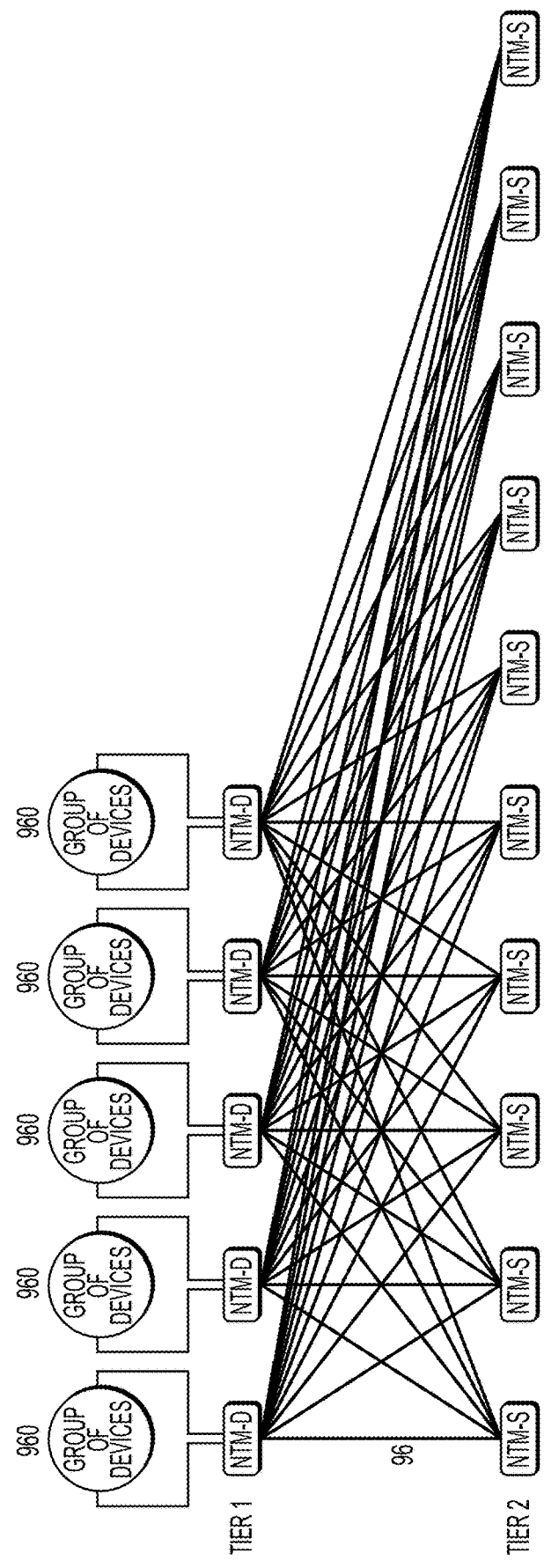
FIG. 6D illustrates aspects of the system of FIG. 6A scaled to 4,800 interconnections.
Figure 6E:
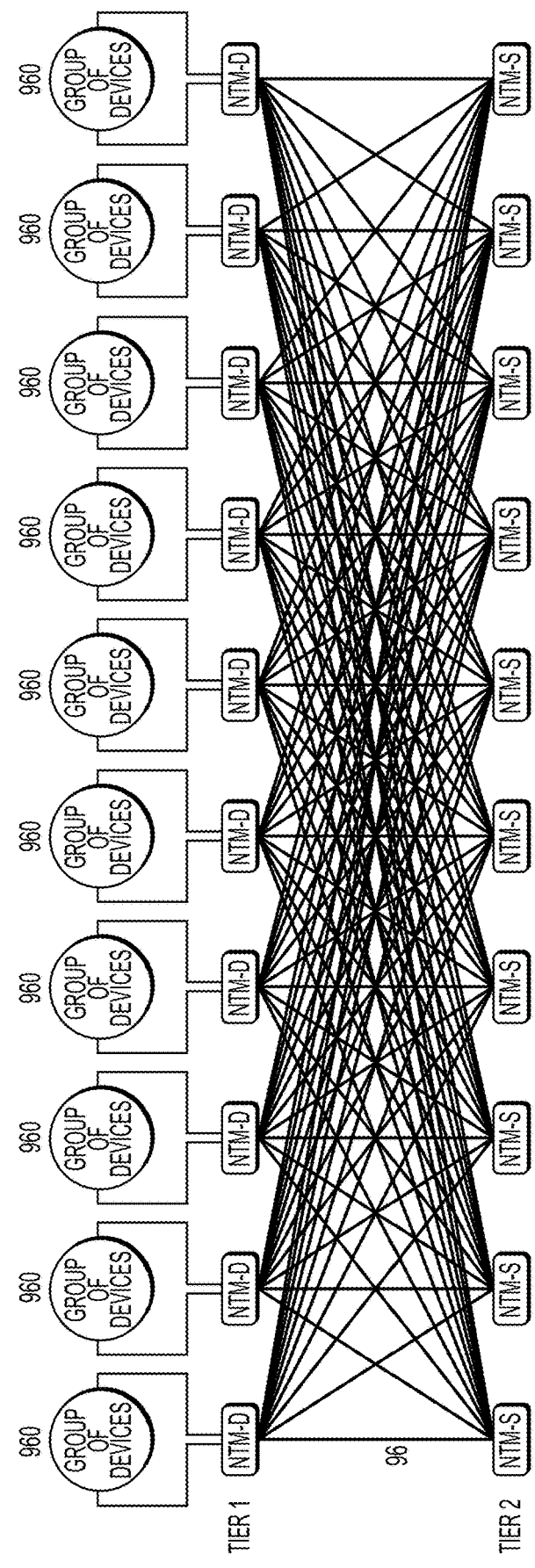
FIG. 6E illustrates aspects of the system of FIG. 6A scaled to 9,600 interconnections.

Increased NTM Interconnect Density with Small Form Factor Duplex Fiber and Connectors In a further example, the NTMs robot reconfigures native duplex fiber pairs instead of single fibers. Native duplex NTMs, that is the NTM-D as, e.g., in FIG. 6A, refers to an NTM in which two fibers are placed within or extruded within a tube, so that any strand in the fiber module corresponds to two fibers instead of one fiber. This allows a duplex connection, which requires a Tx and Rx fiber pair, to replace the simplex or single fiber connection. The NTM-D can then be increased to twice the number of interconnects without increasing its physical size. A particular example uses reduced cladding optical fiber, wherein each fiber has an 80-micron cladding and 125-micron outer diameter polymer coating. The dual fibers are then extruded within a 400-micron tight buffer material, such as Hytrel, polyimide, or another suitable thermoplastic material with relatively low coefficient of friction and relatively high wear resistance.

In an additional example to achieve higher density, it is advantageous for the output connector array to utilize small form factor duplex fiber connectors that fit within the same nominal size as LC simplex connectors. The two fibers of the duplex fiber pair may be terminated within one or two precision ferrules with polished end-faces of the small form factor connector. For example, the "SN" small form factor connectors from Senko or the equivalent from US Conec achieve this size requirements.

EXAMPLE 5

Incremental Scaling of Interconnect Fabric Across a Growing Data Center Campus

Figure 9A:
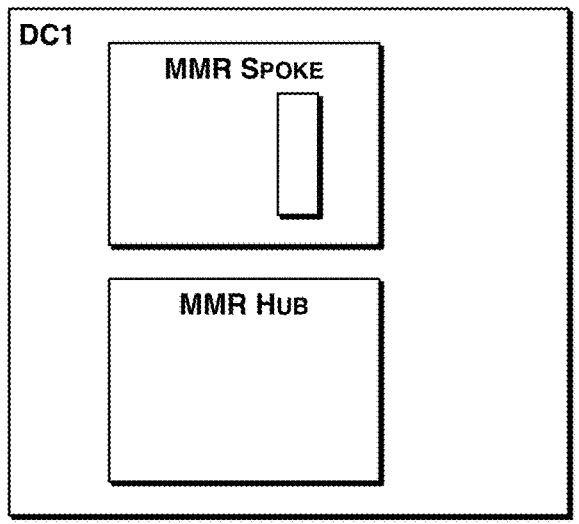
FIGS. 9A-9O illustrate aspects of an example incremental build out according to exemplary embodiments hereof of an interconnect fabric serving an increasing number of data centers.

The multi-tier NTM interconnect fabric is ideal for serving a growing, multi-data center campus. FIGS. 9A-9O illustrate aspects of a particular example of an incremental build out of the interconnect fabric serving an increasing number of data centers. This series of diagrams in FIGS. 9A-9O depict the two-tier NTM architecture, each diagram building on the prior diagram with the addition of new interconnects to illustrate the flexible evolution of the system as it grows. The interconnect fabric is non-blocking and any-to-any at all times. There is no need to make initial assumptions of the percentage of intra-building and percentage of inter-building cross-connections if each tier 1 NTM is filled with no more than 50% user ports, thereby reserving up to 50% of the ports for trunk lines.

FIG. 9A is an example of a tier 1 NTM in an initial data center.

Figure 9B:
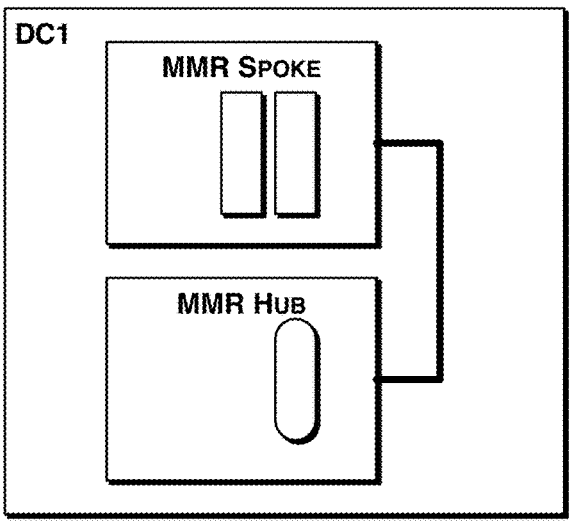

FIG. 9B shows the tier 1 NTM of in an initial data center (FIG. 9A) with addition of user ports and tier 2 NTM.

Figure 9C:
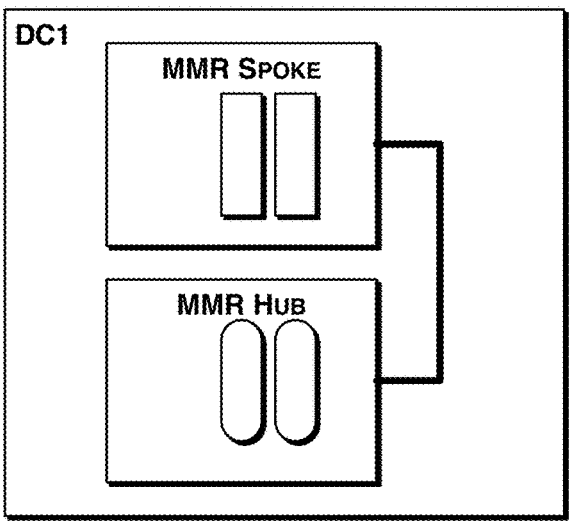

FIG. 9C shows the tier 1 NTM of FIG. 9B with the addition of user ports.

FIG. 9D shows the example two-tier NTM architecture of FIG. 9C with addition of second data center to create a data center campus.

FIG. 9E shows the example two-tier NTM architecture in a two data center campus (e.g., FIG. 9D) with addition of user ports.

Figure 9F:
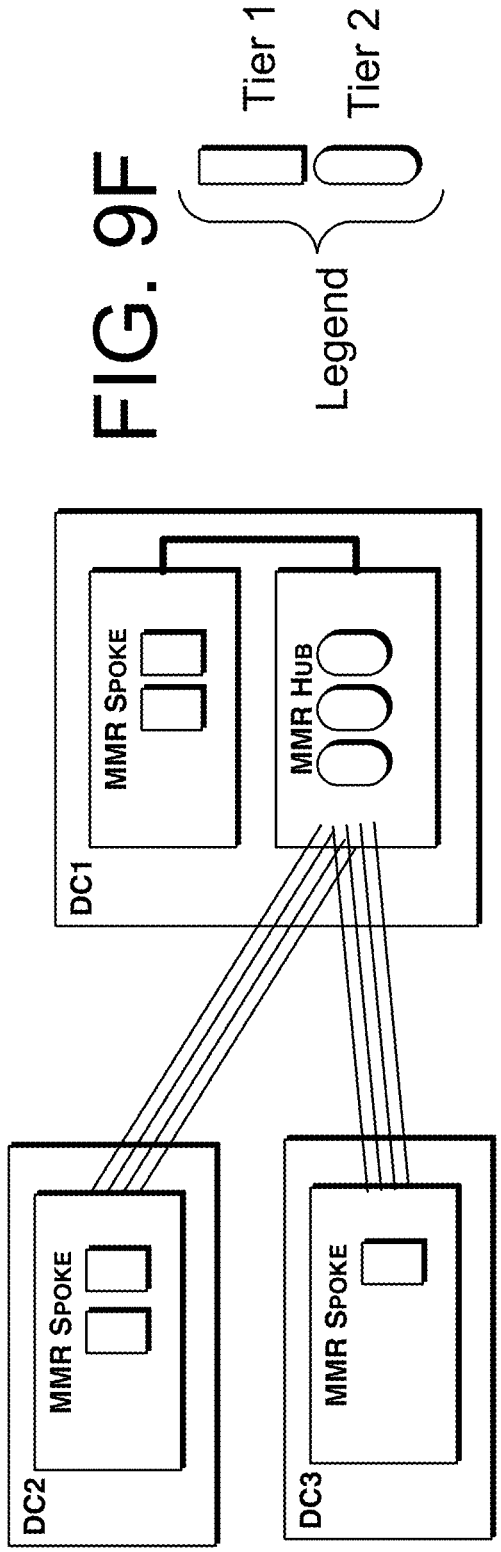

FIG. 9F shows a two-tier NTM architecture (e.g., FIG. 9E) with the addition of a third data center to the campus.

Figure 9G:
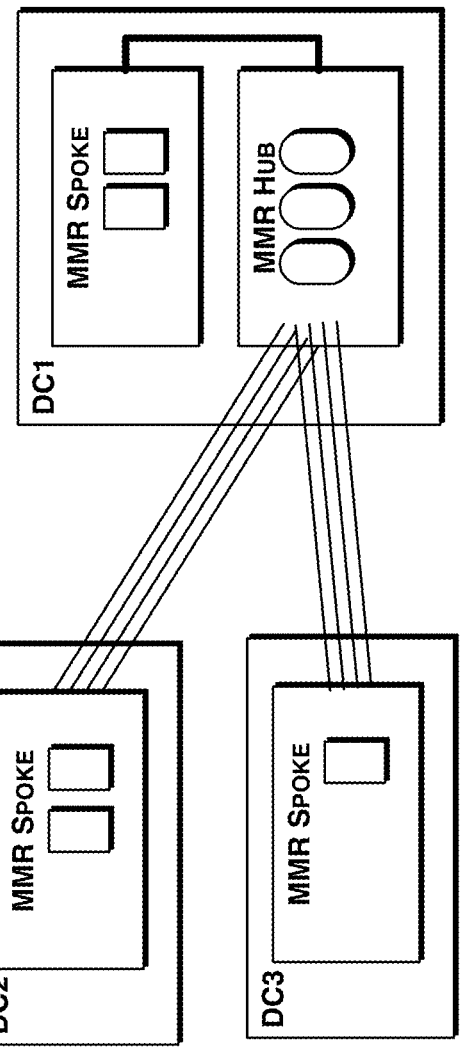

FIG. 9G shows a two-tier NTM architecture in a three data center campus (e.g., FIG. 9F) with addition of user ports.

Figure 9H:
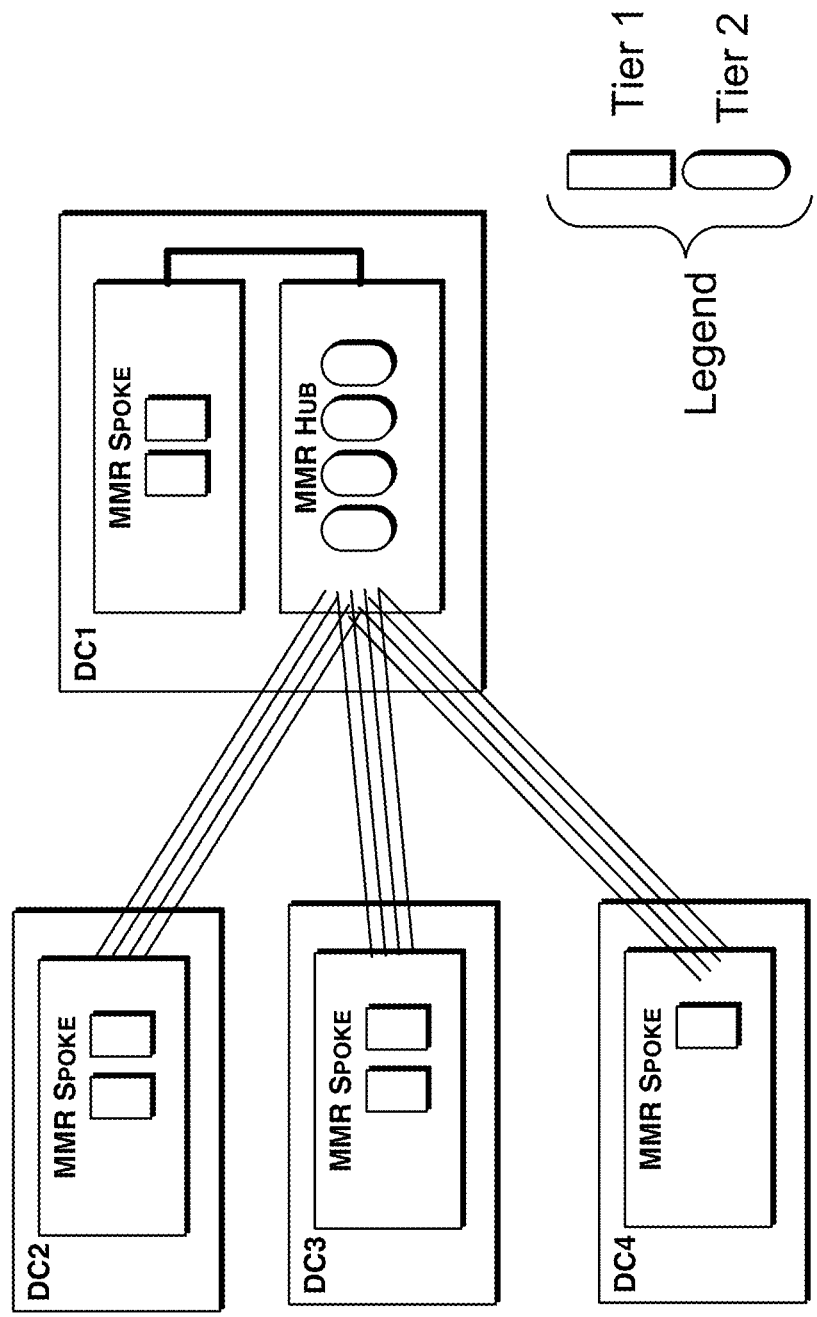

FIG. 9H shows a two-tier NTM architecture (e.g., FIG. 9G) with the addition of a fourth data center to the campus.

FIG. 9I shows a two-tier NTM architecture in a four data center campus (e.g., FIG. 9H) with addition of user ports.

Figure 9J:
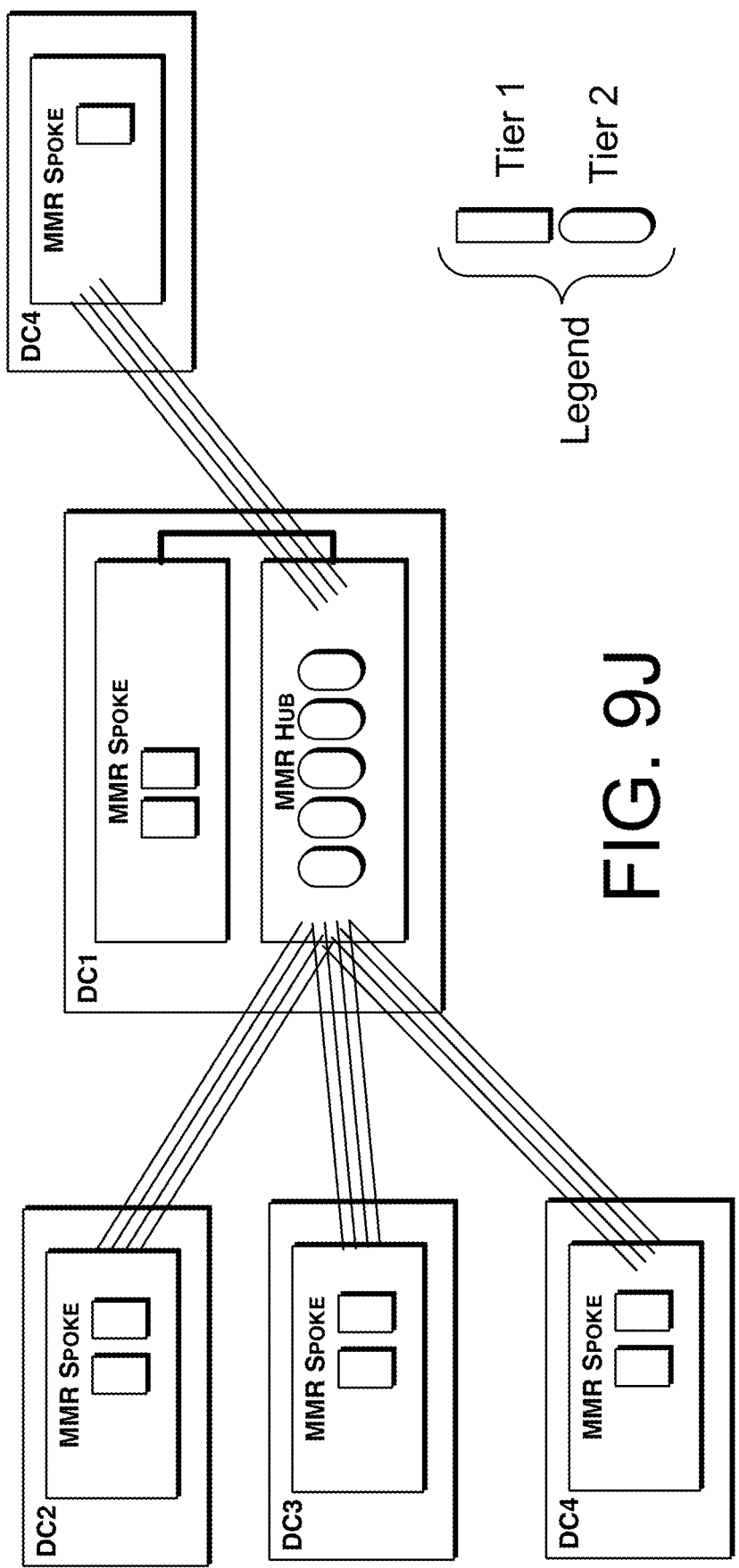

FIG. 9J shows a two-tier NTM architecture (e.g., FIG. 9I) with the addition of a fifth data center to the campus.

Figure 9K:
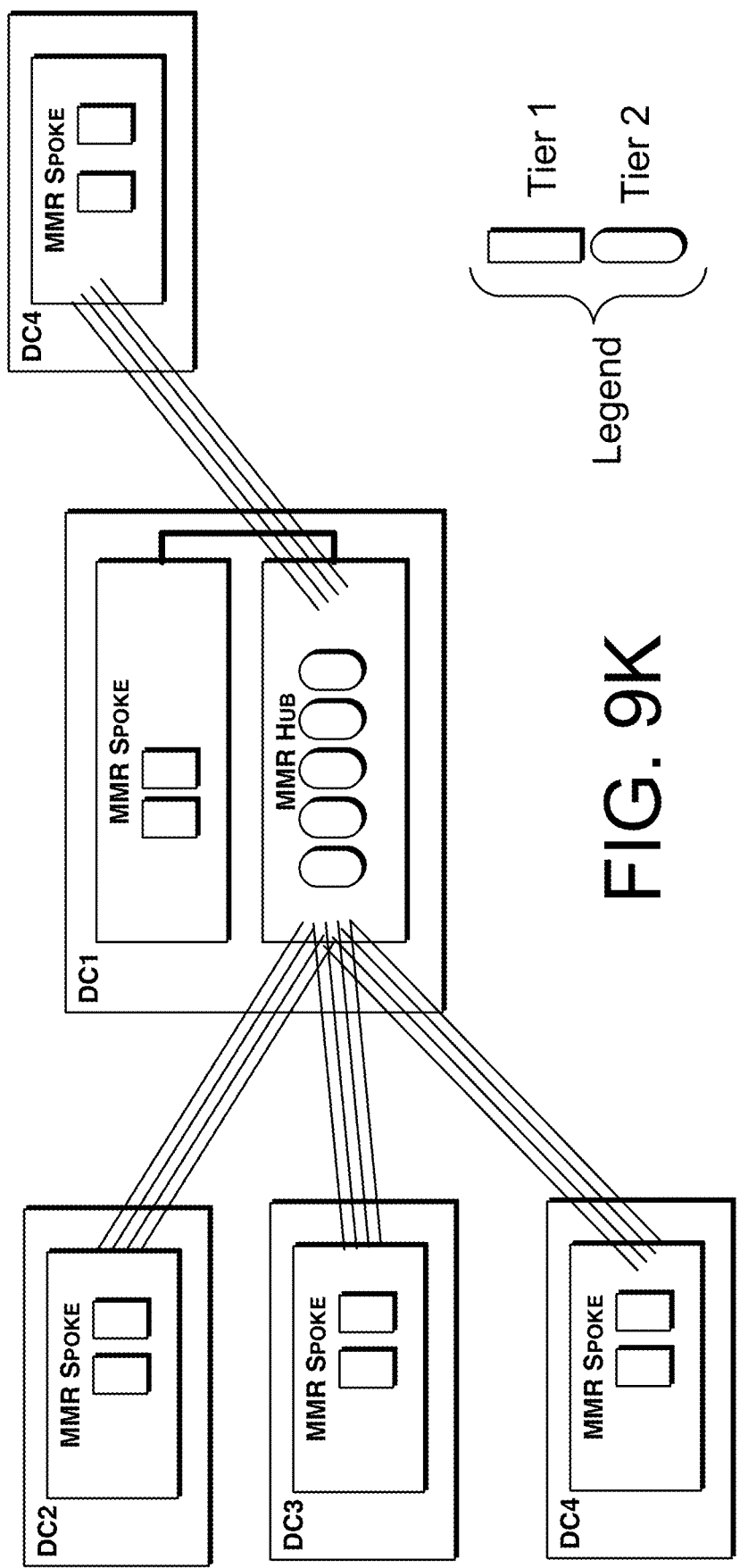

FIG. 9K shows a two-tier NTM architecture in a five data center campus (e.g., FIG. 9J) with addition of user ports.

Figure 9L:
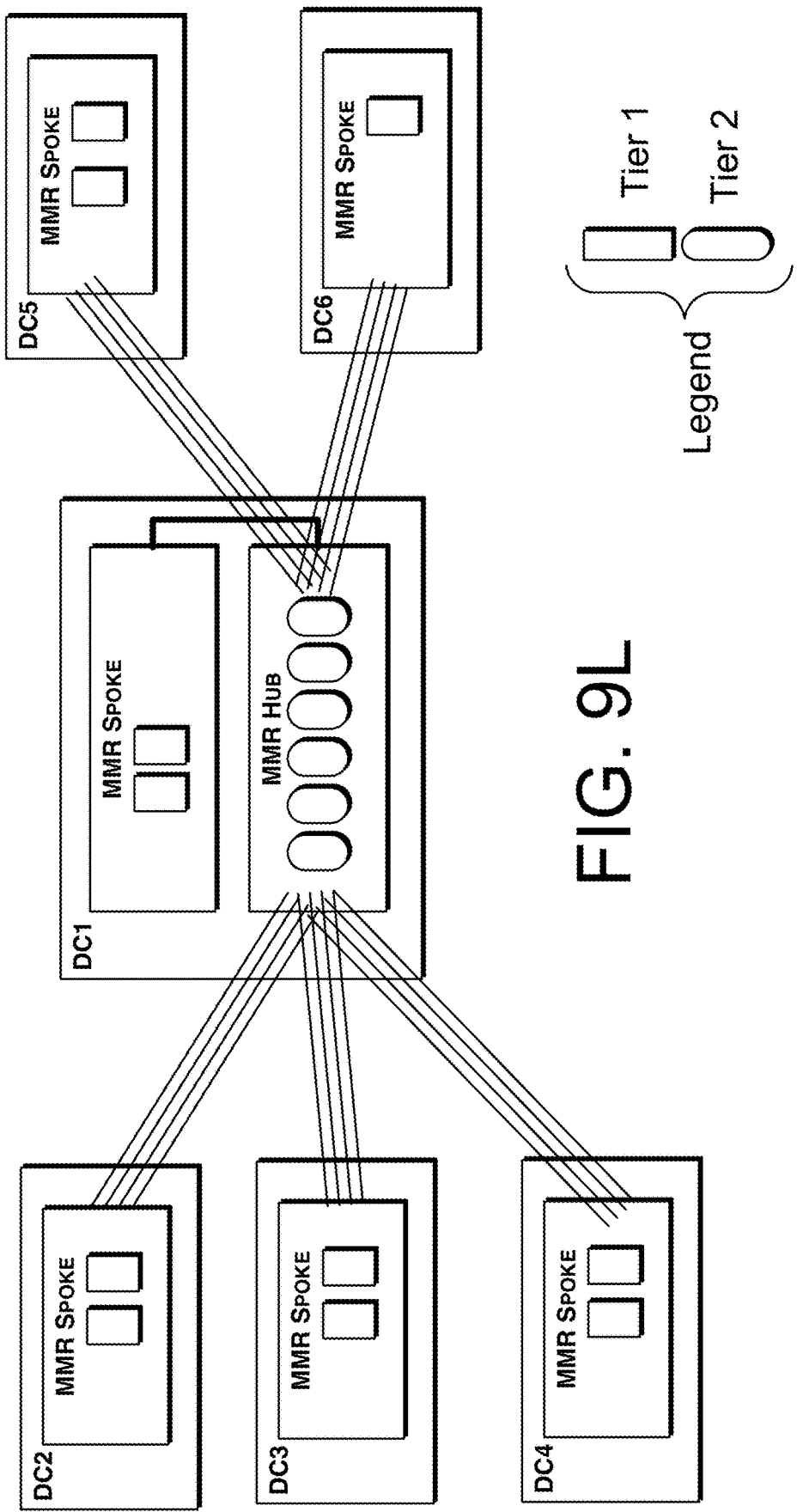

FIG. 9L shows a two-tier NTM architecture (e.g., FIG. 9K) with the addition of a sixth data center to the campus.

FIG. 9M shows a two-tier NTM architecture in a six data center campus (e.g., FIG. 9L) with addition of user ports.

Figure 9N:
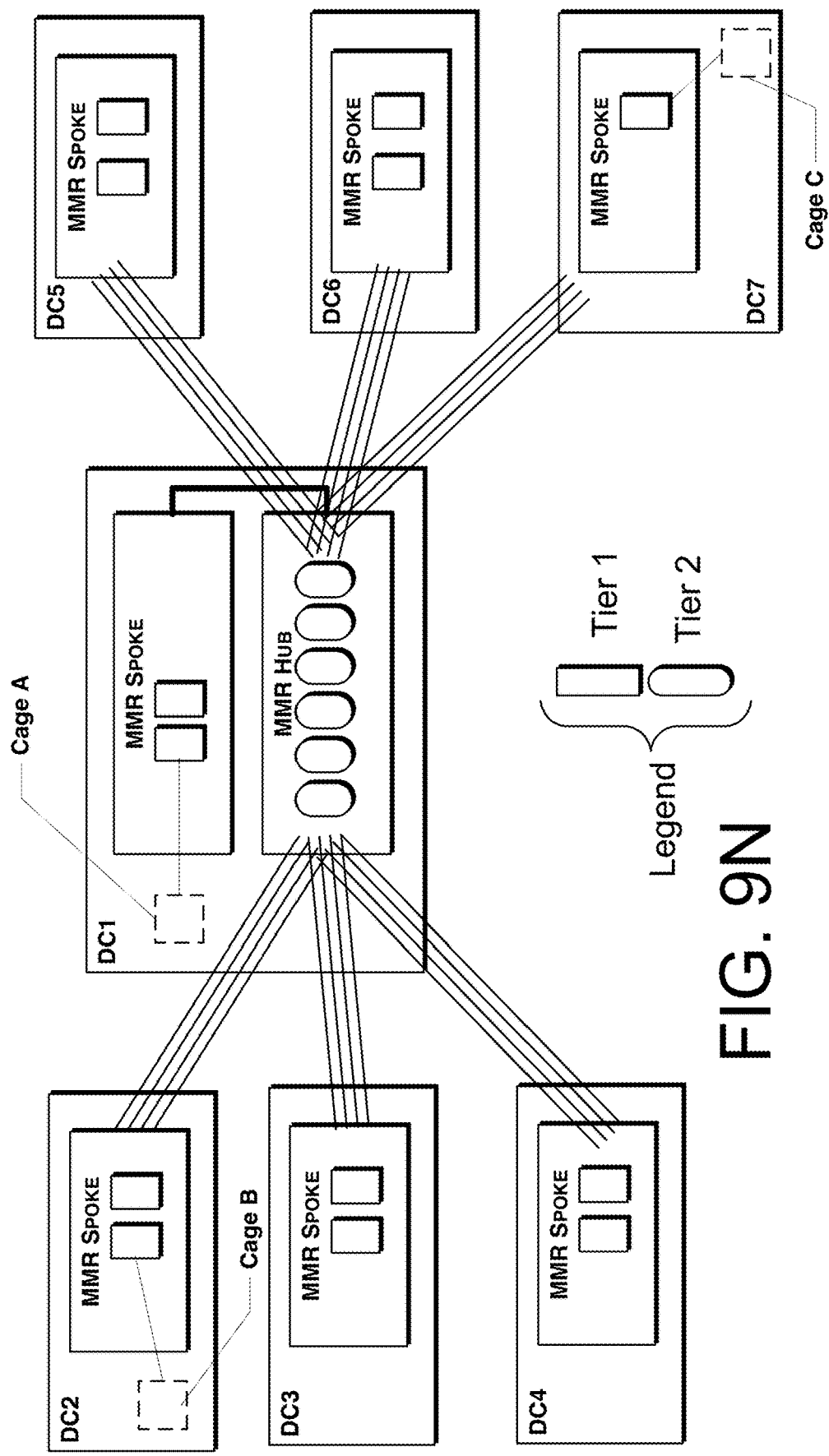
Figure 90:
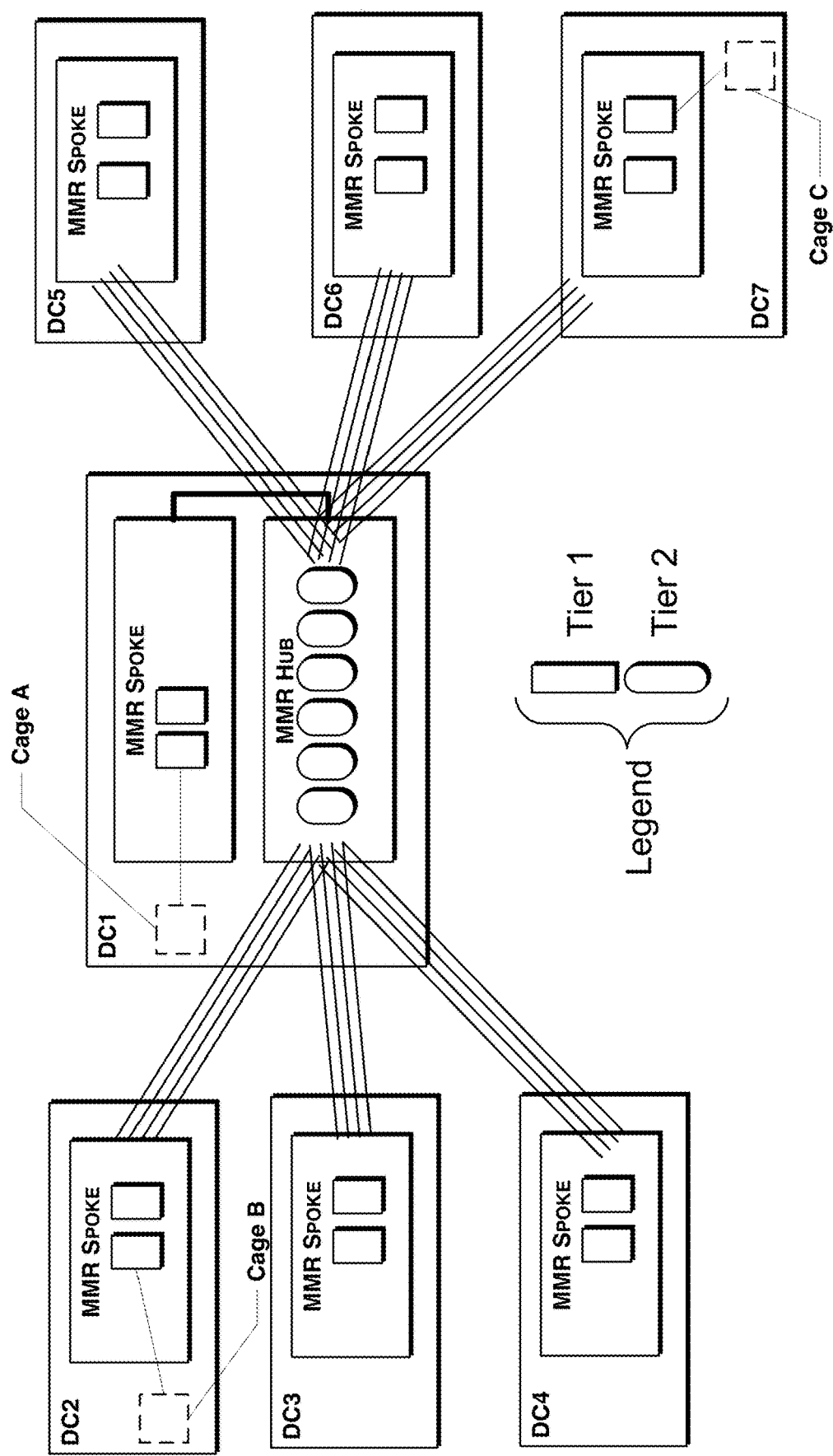

FIG. 9N shows the two-tier NTM architecture (e.g., FIG. 9M) with the addition of a seventh data center to the campus.

FIG. 9O shows the two-tier NTM architecture in a seventh data center campus (e.g., as shown in FIG. 9N) with addition of user ports.

FIG. 10 is a further example of a robotic interconnect fabric for a data center campus, in which the two independent interconnect fabrics have substantially no interconnects therebetween.

FIG. 10 shows aspects of an exemplary 1+1 redundant, two-tier NTM architecture. This is typically referred to in the art as 1:1 redundancy and is a design that improves reliability and availability. If, for example, a large trunk cable between a pair of data centers is damaged, there is a separate trunk cable following a different physical path that would not likely remain operational.

Discussion

The NTM's modular construction of interconnect units, each with typically a hundred interconnects, enables graceful scaling vertically within a rack and scaling horizontally using an incrementally scalable, multi-tier interconnect fabric with user specified connectivity of user ports. The multi-NTM system is designed such that grooming or migration during the expansion process are eliminated. This ensures that there is no interruption of service while incrementally scaling; that is, all existing interconnects are unaffected by the installation of new interconnects across the NTMs, and are unaffected by the installation of additional trunk lines between the NTMs and dictated by capacity demands. The NTM system controller manages the complexity of the trunk lines and tier 2 NTMs so that users can specify the pair of user ports to be interconnected and the controller determines the robotic processes across the multiple NTMs optimal to interconnect the user specified ports. This automated interconnect fabric is non-blocking, allows any-to-any connectivity, and scales from 100 and 100 K interconnects. Those skilled in the art will readily observe that numerous modifications and alterations of the devices may be made while retaining the teachings of the invention.

While multi-tier layer-2 switch fabrics (e.g. Ethernet switches in leaf-spine, hub-spoke configuration, etc.) are known, these architectures do not directly apply to the unique nature of latching robotic physical interconnects. The fundamental difference is related to the orders of magnitude difference is reconfiguration time scale. Ethernet switches convert optical signals to electrical signals and route electronic data packets between ports on timescales of the order of 10 ps. In contrast, the NTM moves physical fibers on the order of 2 minutes and during this time no signals can be transmitted. The physical fiber interconnects in the NTM system cannot necessary be groomed, nor can they be oversubscribed like an opto-electronic packet switch. Grooming of physical fiber interconnects would entail disconnecting, moving and reconnecting physical fiber interconnections, thereby interrupting service. In general, this would demand careful planning, coordination and scheduling of maintenance windows to minimize disruption. Therefore, it is advantageous for the multi-layer physical fiber interconnect system to never, or very rarely, require physical grooming, such that disconnects would be extremely rare. The example architectures and methodologies described in this Invention eliminate the need for grooming and at no time disrupt service on existing interconnections.

Conclusion

Where a process is described herein, those of ordinary skill in the art will appreciate that the process may operate without any user intervention. In other embodiments, the process includes some human intervention (e.g., an act is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of Q" may include some of "Q" or all of "Q."

As used herein, including in the claims, the phrase "using" means "using at least," and is not exclusive. Thus, e.g., the phrase "using Q" means "using at least Q." Unless specifically stated by use of the word "only", the phrase "using Q" does not mean "using only Q."

As used herein, including in the claims, the phrase "based on" means "based in part on" or "based, at least in part, on," and is not exclusive. Thus, e.g., the phrase "based on factor Q" means "based in part on factor Q" or "based, at least in part, on factor Q." Unless specifically stated by use of the word "only", the phrase "based on Q" does not mean "based only on Q."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "R is distinct from Q" means that "R is at least partially distinct from Q," and does not mean that "R is fully distinct from Q." Thus, as used herein, including in the claims, the phrase "R is distinct from Q" means that R differs from Q in at least some way.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention may be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of incrementally scaling a system of cross-connect units in a two-tier system of network topology managers (NTMs), wherein first and second tiers of NTMs are connected with fixed trunk lines containing multiple fiber interconnections, to up to a maximum of M user ports, the method comprising:
   (A) connecting up to N/2 user ports to N/2 devices on a first NTM in said first tier, said first NTM having N user ports;
   (B) adding an additional NTM to said first tier; and
   (C) installing additional fiber modules and/or an NTM in said second tier to support connections between NTM pairs in said first tier.

2. The method of claim 1, wherein said additional NTM is added to said first tier in (B) when interconnections on the NTM in the first tier are fully exhausted at N/2 devices.

3. The method of claim 1, wherein fiber modules and first tier to second tier fixed trunk line cables are installed in numbers to support x % of local user connections and (100-x) % in express connections to another NTM in said first tier.

4. The method of claim 1, wherein at least two of the NTMs have different port counts.

5. The method of claim 1, wherein x % of local user connections may be different for each NTM in said first tier.

6. The method of claim 1, wherein P is an integer multiple of 12.

7. The method of claim 1, wherein in (C), there are up to P fiber connectors between any pair of NTMs in said first tier and said second tier, where $P=N^2/2M$, rounded up to the nearest integer.

8. The method of claim 1, wherein N is about 1,000 to 2,000.

9. The method of claim 1, wherein N is 960 to 2,000, and M is 4,800 to 160,000.

10. A method of scaling a robotically reconfigurable passive fiber interconnect fabric in a leaf and spine configuration to support connectivity requirements as data center interconnect fabric grows and as new data centers are added, the method comprising:
   installing a first leaf NTM in first data center;
   adding a second leaf NTM once x % of ports of first leaf NTM are connected to users in first data center, for some number x;
   installing a spine NTM to connect (100-x) % of ports between first and second leaf NTMs in first data center and connecting spine NTM to leaf NTMs through trunk lines;
   installing additional leaf NTMs in second data center and connecting this leaf NTM to the one or more spine NTMs in first data center; and
   repeating this process of adding leaf and spine NTMs and trunk lines therebetween as data centers are added.

11. The method of claim 10 wherein x is 25 to 75.

12. An incrementally scalable multi-tier NTM interconnect system, the system comprising:
   one or more tier 1 NTMs;
   one or more tier 2 NTMs;
   element managers for said NTMs to perform Knots, Braids and Strands (KBS) routing of fiber;
   trunk lines connecting tier 1 NTMs and tier 2 NTMs;
   user interconnects connected to a portion of tier 1 NTM ports; and
   an NTM system controller accepting commands create an interconnection between a first user port and a second user port, wherein said first user port and said second user port are on the one or more tier 1 NTMs, the controller in communication with all NTMs and sending reconfiguration instructions to all NTMs necessary to create an interconnection between said first user port and said second user port.

13. The system of claim 12, wherein an NTM trunk line routing mechanism determines an optimal set of NTMs based on a cost function to create an optimal fiber interconnection between said first user port and said second user port and passing through multiple NTMs and fiber trunk lines.

14. The system of claim 13, wherein the cost function is designated to minimize one or more of: (i) insertion loss, and/or (ii) a number of hops through NTMs.

15. The system of claim 14, wherein the maximum number of user interconnects is equal to half of a total number of user ports in said one or more tier 1 NTMs.

16. The system of claim 12, wherein at least some of said one or more tier 1 NTMs are co-located.

17. The system of claim 14, wherein at least some of said one or more tier 1 NTMs are co-located with at least some of said one or more tier 2 NTMs.

18. The system of claim 14, wherein at least some of said tier 1 NTMs are located at distinct locations.

19. The system of claim 14, wherein at least some of said one or more tier 2 NTMs are located at distinct locations.

* * * * *